United States Patent
Kamada et al.

(10) Patent No.: US 7,373,933 B2
(45) Date of Patent: May 20, 2008

(54) CONTROL APPARATUS AND CONTROL METHOD OF VEHICULAR DRIVING APPARATUS

(75) Inventors: Atsushi Kamada, Toyota (JP); Atsushi Tabata, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 22 days.

(21) Appl. No.: 11/441,233

(22) Filed: May 26, 2006

(65) Prior Publication Data

US 2006/0270519 A1    Nov. 30, 2006

(30) Foreign Application Priority Data

May 27, 2005    (JP)    ............... 2005-156479

(51) Int. Cl.
*F02M 25/07* (2006.01)
*F02B 47/08* (2006.01)
*B60K 1/02* (2006.01)

(52) U.S. Cl. ............ 123/568.21; 477/3; 180/65.2

(58) Field of Classification Search ........ 123/350, 123/352, 357, 478, 480, 568.11, 568.12, 568.21; 60/605.2; 701/22, 51, 54, 104, 105, 108, 701/115; 180/65.2–65.4; 477/3–6
See application file for complete search history.

(56) References Cited

U.S. PATENT DOCUMENTS 5,927,416 A * 7/1999 del Re et al. ............ 180/65.2

| | | | |
|---|---|---|---|
| 6,301,529 B1 * | 10/2001 | Itoyama et al. | 701/22 |
| 6,490,511 B1 * | 12/2002 | Raftari et al. | 701/22 |
| 6,687,581 B2 * | 2/2004 | Deguchi et al. | 701/22 |
| 6,887,180 B2 * | 5/2005 | Pels et al. | 477/3 |
| 6,907,325 B1 * | 6/2005 | Syed et al. | 701/22 |
| 6,932,175 B2 * | 8/2005 | Teraji et al. | 180/65.2 |
| 2005/0003928 A1 * | 1/2005 | Niki et al. | 477/5 |

FOREIGN PATENT DOCUMENTS

| JP | 6-4344 U | 1/1994 |
|---|---|---|
| JP | 11-173173 A | 6/1999 |
| JP | 2004-058689 A | 2/2004 |
| JP | 2004-197703 A | 7/2004 |
| JP | 2004-204778 A | 7/2004 |
| JP | 2005-320941 A | 11/2005 |

* cited by examiner

*Primary Examiner*—Willis R. Wolfe, Jr.
(74) *Attorney, Agent, or Firm*—Sughrue Mion, PLLC

(57) ABSTRACT

A control apparatus/method curbs the degradation of emission gas, for a vehicular driving apparatus including an engine and a second driving power source that assists the engine in the output of driving power. Torque assist is executed by a hybrid controller through the use of a first motor-generator and/or the second motor-generator so that the EGR rate achieved by an EGR device becomes greater than or equal to an EGR rate threshold value (first EGR rate) determined on the basis of the load state of an engine. Therefore, it becomes possible to put the engine in a low load state where the EGR rate, which decreases as the engine shifts to higher load states, is greater than or equal to the EGR rate threshold value.

17 Claims, 13 Drawing Sheets

FIG.3

|     | C1 | C2 | C3 | C4 | B1 | B2 |
|-----|----|----|----|----|----|----|
| 1st | O  |    |    |    |    | O  |
| 2nd | O  |    |    |    | O  |    |
| 3rd | O  |    | O  |    |    |    |
| 4th | O  |    |    | O  |    |    |
| 5th | O  | O  |    |    |    |    |
| 6th |    | O  |    | O  |    |    |
| 7th |    | O  | O  |    |    |    |
| 8th |    | O  |    |    | O  |    |
| R1  |    |    | O  |    |    | O  |
| R2  |    |    |    | O  |    | O  |

O : ENGAGED

FIG.7

| OPERATION MODE | Ci | ENG | MG1 | MG2 |
|---|---|---|---|---|
| ENGINE RUN MODE | ○ | ○ | (REGENERATION) | × |
| ENGINE+MOTOR RUN MODE | ○ | ○ | × | POWERING |
| MOTOR RUN/LAUNCH MODE | × | △ | (REGENERATION) | POWERING |

CONTROL APPARATUS AND CONTROL METHOD OF VEHICULAR DRIVING APPARATUS

INCORPORATION BY REFERENCE

The disclosure of Japanese Patent Application No. 2005-156479 filed on May 27, 2005, including the specification, drawings and abstract is incorporated herein by reference in its entirety.

BACKGROUND OF THE INVENTION

1. Field of the Invention

The invention relates to a control apparatus/method of a vehicular driving apparatus comprising an engine and a second driving power source that assists the engine in the output of driving power. More particularly, the invention relates to a technology of controlling the load state of the engine in order to curb degradation of the emission gas.

2. Description of the Related Art

Vehicles equipped with an emission gas recirculation device, a so-called EGR device, which refluxes a portion of the emission gas of an engine, such as a diesel engine or the like, to the intake system, that is, recirculates it to the intake system in order to reduce the amount of emission of NOx (oxides of nitrogen) are well known. See, e.g., Japanese Patent Application Laid-Open Publication No. JP-A-2004-197703; Japanese Patent Application Laid-Open Publication No. JP-A-2004-204778; and Japanese Utility Model Application Laid-Open Publication No. JP-U-6-4344. In such vehicles, an EGR valve is provided in an EGR passageway that connects an exhaust passageway and an intake passageway of the engine. The amount of opening/closure of the EGR valve is controlled in accordance with the state of operation (state of load) of the engine so as to adjust an emission gas reflux amount (emission gas recirculation amount, or EGR amount) which is the amount of emission gas refluxed, or an emission gas reflux rate (emission gas recirculation rate, or EGR rate), which indicates the emission gas reflux amount with respect to the amount of inflow air.

However, if the intake negative pressure decreases as the engine shifts to a higher-load operation state, the EGR rate may decrease so that the NOx (oxides of nitrogen) emission amount cannot be reduced. Moreover, if the emission gas recirculation (EGR) device is required to operate in a high engine load region, PM (particulate matter) in the emission gas may increase; that is, there is a possibility that performance of EGR may be substantially impaired in the high engine load region.

SUMMARY OF THE INVENTION

The invention has been accomplished in view of the foregoing circumstances. One object of the invention is to provide a control apparatus/method that curbs the degradation of emission gas, for a vehicular driving apparatus comprising an engine and a second driving power source that assists the engine in the output of driving power.

In a first aspect of the invention, (a) a control apparatus of a vehicular driving apparatus includes an engine as a driving power source, a second driving power source that assists the engine in output of driving power, and an emission gas recirculation device that recirculates a portion of an emission gas of the engine to an intake system, and (b) the control apparatus also includes a second driving power source controller that assists the engine in the output of driving power through the use of the second driving power source so that an emission gas recirculation amount provided by the emission gas recirculation device becomes greater than or equal to a first emission gas recirculation amount that is set based on a load state of the engine.

The assist for the engine in the output of driving power is performed by the second driving power source controller through the use of the second driving power source so that the emission gas recirculation amount provided by the emission gas recirculation device becomes greater than or equal to the first emission gas recirculation amount. Hence, it becomes possible to put the engine in a low load state where the emission gas recirculation amount, which decreases as the engine shifts to higher load states, is greater than or equal to the first emission gas recirculation amount. In other words, by expanding the regions where the emission gas recirculation amount greater than or equal to the first emission gas recirculation amount is effected by putting the engine in a low load state, degradation of emission gas is curbed. Furthermore, since the assist for the engine in the output of driving power is performed by the second driving power source controller through the use of the second driving power source, the output necessary to run the vehicle can be secured even if the engine is put in a low load state.

Preferably, in a second aspect of the invention, the second driving power source controller does not perform assist for the engine in the output of driving power through the use of the second driving power source, if the emission gas recirculation amount provided by the emission gas recirculation device is greater than or equal to a second emission gas recirculation amount that is set greater than the first emission gas recirculation amount. Due to this arrangement, in a low load state of the engine where the emission gas recirculation amount provided by the emission gas recirculation device is basically large, the energy loss associated with the use of the second driving power source disappears.

Furthermore, in a third aspect of the invention, (a) a control apparatus of a vehicular driving apparatus includes an engine as a driving power source, a second driving power source that assists the engine in output of driving power, and an emission gas recirculation device that recirculates a portion of an emission gas of the engine to an intake system, and (b) the control apparatus also includes a second driving power source controller that assists the engine in the output of driving power through the use of the second driving power source so that an emission gas recirculation rate provided by the emission gas recirculation device becomes greater than or equal to a first emission gas recirculation rate that is set based on a load state of the engine.

The assist for the engine in the output of driving power is performed by the second driving power source controller through the use of the second driving power source so that the emission gas recirculation rate provided by the emission gas recirculation device becomes greater than or equal to the first emission gas recirculation rate. Hence, it becomes possible to put the engine in a low load state where the emission gas recirculation rate, which decreases as the engine shifts to higher load states, is greater than or equal to the first emission gas recirculation rate. In other words, by expanding the regions where the emission gas recirculation rate greater than or equal to the first emission gas recirculation rate is effected by putting the engine in a low load state, degradation of emission gas is curbed. Furthermore, since the assist for the engine in the output of driving power is performed by the second driving power source controller through the use of the second driving power source, the output necessary to run the vehicle can be secured even if the engine is put in a low load state.

Preferably, in a fourth aspect of the invention, the second driving power source controller does not perform assist for the engine in the output of driving power through the use of the second driving power source, if the emission gas recirculation rate provided by the emission gas recirculation device is greater than or equal to a second emission gas recirculation rate that is set greater than the first emission gas recirculation rate. Due to this arrangement, in a low load state of the engine where the emission gas recirculation rate provided by the emission gas recirculation device is basically high, the energy loss associated with the use of the second driving power source disappears.

Also preferably, (a) a control apparatus of a vehicular driving apparatus includes an engine as a driving power source, and a second driving power source that assists the engine in output of driving power, and (b) the control apparatus also includes a second driving power source controller that assists the engine in the output of driving power through a use of the second driving power source so that an emission gas amount of the engine becomes less than or equal to a predetermined emission gas amount that is set based on a load state of the engine. Therefore, the assist for the engine in the output of driving power is performed by the second driving power source controller through the use of the second driving power source so that the emission gas amount of the engine is less than or equal to the predetermined emission gas amount set on the basis of the load state of the engine. Hence, it becomes possible to put the engine in a low load state where the emission gas amount, which increases as the engine shifts to higher load states, is less than or equal to the predetermined emission gas amount. In other words, by expanding the regions where the emission gas amount less than or equal to the predetermined emission gas amount is effected by putting the engine in a low load state, degradation of emission gas is curbed. Furthermore, since the assist for the engine in the output of driving power is performed by the second driving power source controller through the use of the second driving power source, the output necessary to run the vehicle can be secured even if the engine is put in a low load state.

Also preferably, in a fifth aspect of the invention, the control apparatus of the vehicular driving apparatus further includes a power transfer device that transfers the output of the engine to a driving wheel, and a power transfer state controller that controls a power transfer state of the power transfer device so that reduction in the driving torque on the driving wheels is curbed even if the output of the engine decreases, such as when it is not possible to perform the assist for the engine in the output of driving power by the second driving power source controller through the use of the second driving power source. Due to this arrangement, by reducing the output of the engine, that is, by decreasing the load state of the engine, the emission gas recirculation amount (or the emission gas recirculation rate) can be secured and the emission gas amount can be reduced. Furthermore, the control of the power transfer state of the power transfer device makes it possible to prevent the degradation in the running performance of the vehicle caused by reduced engine output, and thus secures a good running performance.

Preferably, as the engine provided as the driving power source, internal combustion engines, including a gasoline engine, a diesel engine, etc., are widely used. The second driving power source that assists the engine in the output of driving power may be, by way of example only, an electric motor.

Furthermore, preferably, the power transfer device may be, as examples, a transmission, a lockup clutch provided on a torque converter, etc. When it is not possible to perform the assist for the engine in the output of driving power by the second driving power source controller through the use of the second driving power source for the purpose of making the emission gas recirculation amount (or the emission gas recirculation rate) provided by the emission gas recirculation device greater than or equal to the first emission gas recirculation amount (or the first emission gas recirculation rate) that is set on the basis of the load state of the engine, the power transfer state of the power transfer device is controlled. Specifically, the transmission may be switched to a lower speed-side gear stage (lower gear) or the lockup clutch may be released or the slip amount may be reduced via the power transfer state controller, so that even if the output of the engine decreases, reduction in the driving torque on the driving wheels is curbed.

Preferably, the transmission is constructed of any one of or a combination of various planetary gear type multi-stage transmissions having, for example, four forward stages, five forward stages, six forward stages, or more speed change stages, in which an appropriate one of a plurality of gear stages is established by selectively coupling rotating elements of a plurality of planetary gear sets via friction engagement devices. Belt-type stepless transmissions may also be used in which a power transfer belt that functions as a power transfer member is disposed on a pair of variable pulleys whose effective diameters are variable and, therefore, the speed change ratio can be changed steplessly and continuously. Toroidal-type stepless transmissions may also be used, in which a pair of cone members are rotated about a common center axis, and a plurality of rollers that are each rotatable about a rotating axis intersecting with the common center axis are sandwiched by the two cone members, and in which the speed change ratio is continuously changed by changing the angle of intersection between the common center axis and the rotating axes of the rollers. Synchronous mesh-type parallel 2-axis manual transmissions may also be used, in which a plurality of speed change gears that are always in mesh are provided between two axes, and any one pair of speed change gears are selectively put into a power transfer state by a synchronizer device. Also applicable are synchronous mesh-type parallel 2-axis manual transmissions that are similar to the foregoing synchronous mesh-type parallel 2-axis manual transmissions, but are capable of the automatic switching between gear stages via a synchronizer device driven by a hydraulic actuator. Still another option is an automatic transmission including a differential mechanism constructed of, for example, a planetary gear device, for distributing power from the engine to a first electric motor and an output shaft, and a second electric motor provided on an output shaft of the differential mechanism. Due to the differential operation of the differential mechanism, a major portion of the power from the engine is mechanically transferred to the driving wheels, and the remaining portion of the power from the engine is electrically transferred through the use of an electrical path from the first electric motor and the second electric motor so that the speed change ratio is electrically changed, for example. Yet another option is a hybrid vehicle driving apparatus that functions as an electric stepless transmission. These are just some examples of transmissions that could be used with the present invention, and this list is not intended to be exhaustive or to limit the invention.

Furthermore, preferably, the installed posture of the transmission relative to the vehicle may be transverse in which the axis of the transmission is in the direction of the vehicle width as in FF (front engine, front wheel drive) vehicles and the like, or a longitudinal fashion in which the axis of the transmission is in the longitudinal direction of the vehicle as in FR (front engine, rear wheel drive) vehicles and the like.

Preferably, as for the aforementioned friction engagement devices, hydraulic friction engagement devices, including a multi-disc type in which elements are engaged by a hydraulic actuator, single-disc clutches or brakes, belt-type brakes, etc., are widely used. The oil pump that supplies the operating oil for engaging the hydraulic friction engagement devices may be, for example, an oil pump that is driven by a vehicle-running power source to eject the operating oil, or may also be an oil pump that is driven by a dedicated electric motor provided separately from the vehicle-running power source. The clutches or brakes may be electromagnetic engagement devices, for example, electromagnetic clutches, magnetic particle clutches, etc., as well as hydraulic friction engagement devices. Again, these examples are not intended to be exhaustive or to limit the invention.

Furthermore, it is appropriate that the driving power source and the transmission be operatively coupled. For example, a pulsation absorbing damper (vibration damping device), a lockup clutch, a damper-equipped lockup clutch, a fluid power transfer device, etc., may be disposed between the driving power source and the transmission. It is also possible that the driving power source and the input shaft of the transmission are always coupled. The fluid power transfer device may be a lockup clutch-equipped torque converter, a fluid coupling, etc.

Preferred embodiments of the invention will be described hereinafter with reference to the drawings.

BRIEF DESCRIPTION OF THE DRAWINGS

FIG. 3 is an operation table showing relationships between the speed change stages of the automatic transmission and combinations of operations of engagement elements needed for establishing the speed change stages;

FIG. 4 is a diagram schematically illustrating the driving apparatus shown in FIG. 1 and the like, and is also a block diagram illustrating portions of a control system provided in the vehicle for controlling the driving apparatus and the like;

FIG. 7 is an example set of operation modes possible in the vehicular driving apparatus shown in FIG. 1;

DETAILED DESCRIPTION OF THE PREFERRED EMBODIMENTS

Figure 1:
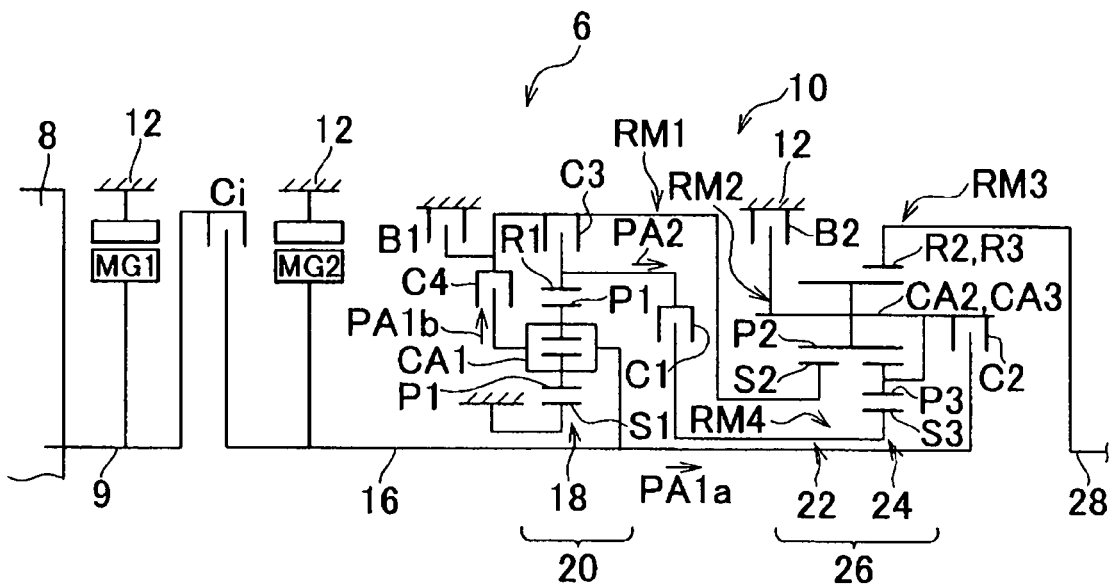
FIG. 1 is a diagram illustrating portions of a vehicular driving apparatus to which a control apparatus in accordance with an embodiment of the invention may be applied.

FIG. 1 is a diagram illustrating the construction of a vehicular driving apparatus (hereinafter, referred to as "driving apparatus") 6 provided in a vehicle to which the invention is applied. The driving apparatus 6 is made up of a transmission case 12 provided as a non-rotational member attached to a vehicle body, and a first motor-generator MG1 as a first electric motor, a lockup clutch Ci, a second motor-generator MG2 as a second electric motor, and a stepped automatic transmission (hereinafter, referred to as "automatic transmission") 10 which are sequentially disposed about a common axis in the transmission case 12. This automatic transmission 10 is made up of an input shaft 16 that is mechanically coupled to a crankshaft 9 of a diesel engine (hereinafter, referred to as "engine") 8 as a driving power source exclusively via the lockup clutch Ci, a first speed changer portion 20 constructed mainly of a first planetary gear set 18, a second speed changer portion 26 constructed mainly of a second planetary gear set 22 and a third planetary gear set 24, and an output shaft 28 which are sequentially disposed. The automatic transmission 10 changes the speed of rotation of the input shaft 16, and outputs rotation from the output shaft 28. The input shaft 16 functions as an output-side rotating member of the lockup clutch Ci and, at the same time, functions as an input rotating member of the automatic transmission 10 as well. The output shaft 28 corresponds to an output rotating member of the automatic transmission 10, and rotationally drives, for example, right and left-side driving wheels 32 sequentially via a differential gear set (final speed reducer) 30, a pair of axles, etc. See FIG. 6. The first motor-generator MG1 is direct-operatively coupled to the engine 8, and the second motor-generator MG2 is direct-operatively coupled to the input shaft 16. Incidentally, since the driving apparatus 6 is constructed symmetrically about its axis, the diagram of FIG. 1 does not show a portion of the driving apparatus 6 below its axis.

The first planetary gear set 18 is a double-pinion type planetary gear set, and includes a sun gear S1, plural pairs of pinion gears P1 meshed with each other, a carrier CA1 supporting the pinion gears P1 rotatably about their own axes and about the common axis, and a ring gear R1 meshed with the sun gear S1 via the pinion gears P1. The carrier CA1 is coupled to the input shaft 16 so as to be rotationally driven. The sun gear S1 is unrotatably fixed integrally to the transmission case 12. The ring gear R1 functions as an intermediate output member, and transfers rotation to the second speed changer portion 26 while the rotation speed thereof is being reduced relative to that of the input shaft 16. In this embodiment, a path is provided for transferring the rotation of the input shaft 16 to the second speed changer portion 26 without changing the rotation speed, which is a first intermediate output path PA1 of transferring rotation at a predetermined constant speed change ratio (=1.0). The first intermediate output path PA1 includes a directly coupled path PA1$a$ of transferring rotation from the input shaft 16 to the second speed changer portion 26 without transfer through the first planetary gear set 18, and an indirect path PA1$b$ of transferring rotation from the input shaft 16 to the second speed changer portion 26 via the carrier CA1 of the first planetary gear set 18. As another path of transferring rotation from the input shaft 16 to the second speed changer portion 26 via the carrier CA1, the pinion gears P1 disposed on the carrier CA1, and the ring gear R1, there is a second intermediate output path PA2 of transferring rotation of the input shaft 16 while changing the speed (reducing the speed) of rotation at a speed change ratio (>1.0) that is greater than that of the first intermediate output path PA1.

The second planetary gear set 22 is a single-pinion type planetary gear set, and includes a sun gear S2, pinion gears P2, a carrier CA2 supporting the pinion gears P2 rotatably about their own axes and about the common axis, and a ring gear R2 meshed with the sun gear S2 via the pinion gears P2. The third planetary gear set 24 is a double-pinion type planetary gear set, and includes a sun gear S3, a plurality of pairs of pinion gears P2 and P3 meshed with each other, a carrier CA3 supporting the pinion gears P2 and P3 rotatably about their own axes and about the common axis, and a ring gear R3 meshed with the sun gear S3 via the pinion gears P2 and P3.

In the second planetary gear set 22 and the third planetary gear set 24, the carriers CA2 and CA3 that rotatably support the pinion gears P2, and the ring gears R2 and R3 are provided as a single carrier and a single gear for shared use by both sets. Thus, four rotating elements RM1 to RM4 are provided. That is, a first rotating element RM1 is formed by the sun gear S2 of the second planetary gear set 22, and a second rotating element RM2 is formed by the integral coupling of the carrier CA2 of the second planetary gear set 22 and the carrier CA3 of the third planetary gear set 24. Furthermore, a third rotating element RM3 is formed by the integral coupling of the ring gear R2 of the second planetary gear set 22 and the ring gear R3 of the third planetary gear set 24, and a fourth rotating element RM4 is formed by the sun gear S3 of the third planetary gear set 24.

The first rotating element RM1 (sun gear S2) is selectively coupled to the transmission case 12 and, therefore, is stopped from rotating via a first brake B1, and is also selectively coupled to the ring gear R1 of the first planetary gear set 18 which is an intermediate output member (i.e., a second intermediate output path PA2) via a third clutch C3. Furthermore, the first rotating element RM1 is selectively coupled to the carrier CA1 of the first planetary gear set 18 (i.e., the indirect path PA1$b$ of the first intermediate output path PA1) via a fourth clutch C4. The second rotating element RM2 (carrier CA2 and CA3) is selectively coupled to the transmission case 12 and, therefore, is stopped from rotating via a second brake B2, and is also selectively coupled to the input shaft 16 (i.e., the directly coupled path PA1$a$ of the first intermediate output path PA1) via a second clutch C2. The third rotating element RM3 (ring gear R2 and R3) is coupled integrally to the output shaft 28 to output rotation. The fourth rotating element RM4 (sun gear S3) is coupled to the ring gear R1 via a first clutch C1. Incidentally, each of the brakes B1, B2 and the clutches C1 to C4 is a hydraulic friction engagement device of a multi-disc type or the like that is put into friction engagement by a hydraulic cylinder.

Figure 2:
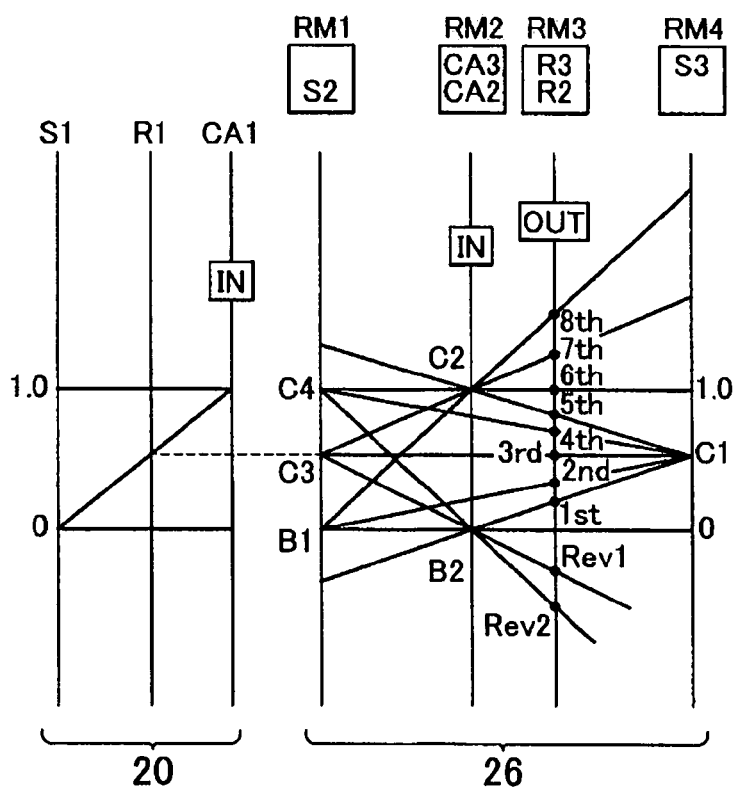
FIG. 2 is a nomogram illustrating the operation of the automatic transmission shown in FIG. 1.

FIG. 2 is a is nomogram in which the rotation speeds of the rotating elements of the first speed changer portion 20 and the second speed changer portion 26 are represented by straight lines, wherein a lower horizontal line indicates a rotation speed of "0", and the upper horizontal line indicates a rotation speed of "1.0", that is, the same rotation speed as that of the input shaft 16. The vertical lines for the first speed changer portion 20 represent the sun gear S1, the ring gear R1 and the carrier CA1 in that order from the left. The intervals therebetween are determined in accordance with the gear ratio ρ1 (=number of teeth of the sun gear S1/number of teeth of the ring gear R1). FIG. 2 shows, for example, the case where the gear ratio ρ1=0.463. The four vertical lines for the second speed changer portion 26 represent the first rotating element RM1 (the sun gear S2), the second rotating element RM2 (the carrier CA2 and the carrier CA3), the third rotating element RM3 (the ring gear R2 and the ring gear R3), and the fourth rotating element RM4 (the sun gear S3) in that order from the left. The intervals therebetween are determined in accordance with the gear ratio ρ2 of the second planetary gear set 22 and the gear ratio ρ3 of the third planetary gear set 24. FIG. 2 shows, for example, the case where the gear ratio ρ2=0.463 and the gear ratio ρ3=0.415.

As is apparent from this monogram, when the first clutch C1 and the second brake B2 are engaged so that the fourth rotating element RM4 is rotated at a reduced speed relative to the input shaft 16 via the first speed changer portion 20 and so that the second rotating element RM2 is stopped from rotating, the third rotating element RM3 coupled to the output shaft 28 is rotated at a rotation speed represented by "1st", thus establishing a first speed change stage "1st" that has a greatest speed change ratio (=rotation speed of the input shaft 16/rotation speed of the output shaft 28).

When the first clutch C1 and the first brake B1 are engaged so that the fourth rotating element RM4 is rotated at a reduced speed relative to the input shaft 16 via the first speed changer portion 20 and so that the first rotating element RM1 is stopped from rotating, the third rotating element RM3 is rotated at a rotation speed represented by "2nd", thus establishing a second speed change stage "2nd" that has a smaller speed change ratio than the first speed change stage "1 st".

When the first clutch C1 and the third clutch C3 are engaged so that the fourth rotating element RM4 and the first rotating element RM1 are rotated at a reduced speed relative to the input shaft 16 via the first speed changer portion 20 and so that the second speed changer portion 26 is rotated as an integral unit, the third rotating element RM3 is rotated at a rotation speed represented by "3rd", thus establishing a third speed change stage "3rd" that has a smaller speed change ratio than the second speed change stage "2nd".

When the first clutch C1 and the fourth clutch C4 are engaged so that the fourth rotating element RM4 is rotated at a reduced speed relative to the input shaft 16 via the first speed changer portion 20 and so that the first rotating element RM1 is rotated integrally with the input shaft 16, the third rotating element RM3 is rotated at a rotation speed represented by "4th", thus establishing a fourth speed change stage "4th" that has a smaller speed change ratio than the third speed change stage "3rd".

When the first clutch C1 and the second clutch C2 are engaged so that the fourth rotating element RM4 is rotated at a reduced speed relative to the input shaft 16 via the first speed changer portion 20 and so that the second rotating element RM2 is rotated integrally with the input shaft 16, the third rotating element RM3 is rotated at a rotation speed represented by "5th", thus establishing a fifth speed change stage "5th" that has a smaller speed change ratio than the fourth speed change stage "4th".

When the second clutch C2 and the fourth clutch C4 are engaged so that the second speed changer portion 26 is rotated integrally with the input shaft 16, the third rotating element RM3 is rotated at a rotation speed represented by "6th", that is, a rotation speed equal to the rotation speed of the input shaft 16, thus establishing a sixth speed change stage "6th" that has a smaller speed change ratio than the fifth speed change stage "5th". The speed change ratio of the sixth speed change stage "6th" is 1.

When the second clutch C2 and the third clutch C3 are engaged so that the first rotating element RM1 is rotated at a reduced speed relative to the input shaft 16 via the first speed changer portion 20 so that the second rotating element RM2 is rotated integrally with the input shaft 16, the third rotating element RM3 is rotated at a rotation speed represented by "7th", thus establishing a seventh speed change stage "7th" that has a smaller speed change ratio than the sixth speed change stage "6th".

When the second clutch C2 and the first brake B1 are engaged so that the second rotating element RM2 is rotated integrally with the input shaft 16 and so that the first rotating element RM1 is stopped from rotating, the third rotating element RM3 is rotated at a rotation speed represented by "8th", thus establishing an eighth speed change stage "8th" that has a smaller speed change ratio than the seventh speed change stage "7th".

When the third clutch C3 and the second brake B2 are engaged so that the first rotating element RM1 is rotated at a reduced speed via the first speed changer portion 20 and so that the second rotating element RM2 is stopped from rotating, the third rotating element RM3 is reversely rotated at a rotation speed represented by "Rev1", thus establishing a first reverse speed change stage that has a greatest speed change ratio in the reverse direction. When the fourth clutch C4 and the second brake B2 are engaged so that the first rotating element RM1 is rotated integrally with the input shaft 16 and so that the second rotating element RM2 is stopped from rotating, the third rotating element RM3 is reversely rotated at a rotation speed represented by "Rev2", thus establishing a second reverse speed change stage "Rev2" that has a smaller speed change ratio than the first reverse speed change stage "Rev1". The first reverse speed change stage "Rev1" and the second reverse speed change stage "Rev2" correspond to the first speed change stage and the second speed change stage, respectively, in the reverse direction.

FIG. 3 is an operation table for explaining the engagement elements for establishing each of the foregoing speed change stages, and the speed change ratios thereof, in which each empty circle indicates an engaged state and each blank indicates a released state. The speed change ratios of the individual speed change stages are appropriately determined by gear-ratios $\rho 1$ to $\rho 3$ of the first planetary gear set 18, the second planetary gear set 22 and the third planetary gear set 24. For example, if $\rho 1=0.463$, $\rho 2=0.459$ and $\rho 3=0.405$, then the values of the speed change ratio step (i.e., the ratios between the speed change ratios of the individual speed change stages) are substantially proper, and the total speed change ratio width (=4.596/0.685) is as large as about 6.709, and the speed change ratios of the reverse speed change stages "Rev1" and "Rev2" are appropriate. Thus, a change ratio characteristic that is proper as a whole is obtained.

Thus, in the automatic transmission 10 of this embodiment, the eight forward speed-change gear stages are achieved by the first speed changer portion 20 that has two intermediate output paths PA1 and PA2 of different speed change ratios and the second speed changer portion 26 that has two planetary gear sets 22, 24, through the engagement switching among the four clutches C1 to C4 and two brakes B1, B2. Therefore, the automatic transmission is constructed in a small size, and is improved in the vehicle installability. Furthermore, as shown in FIG. 2, the automatic transmission 10 of this embodiment makes it possible to set a large speed change ratio width and proper speed change ratio steps. Still further, as is apparent from FIG. 3, the shifting between the speed change stages can be performed merely by changing two engaged elements of the clutches C1 to C4 and the brakes B1, B2, so that the shift control is easy and the occurrence of a shift shock is restrained.

Figure 4:
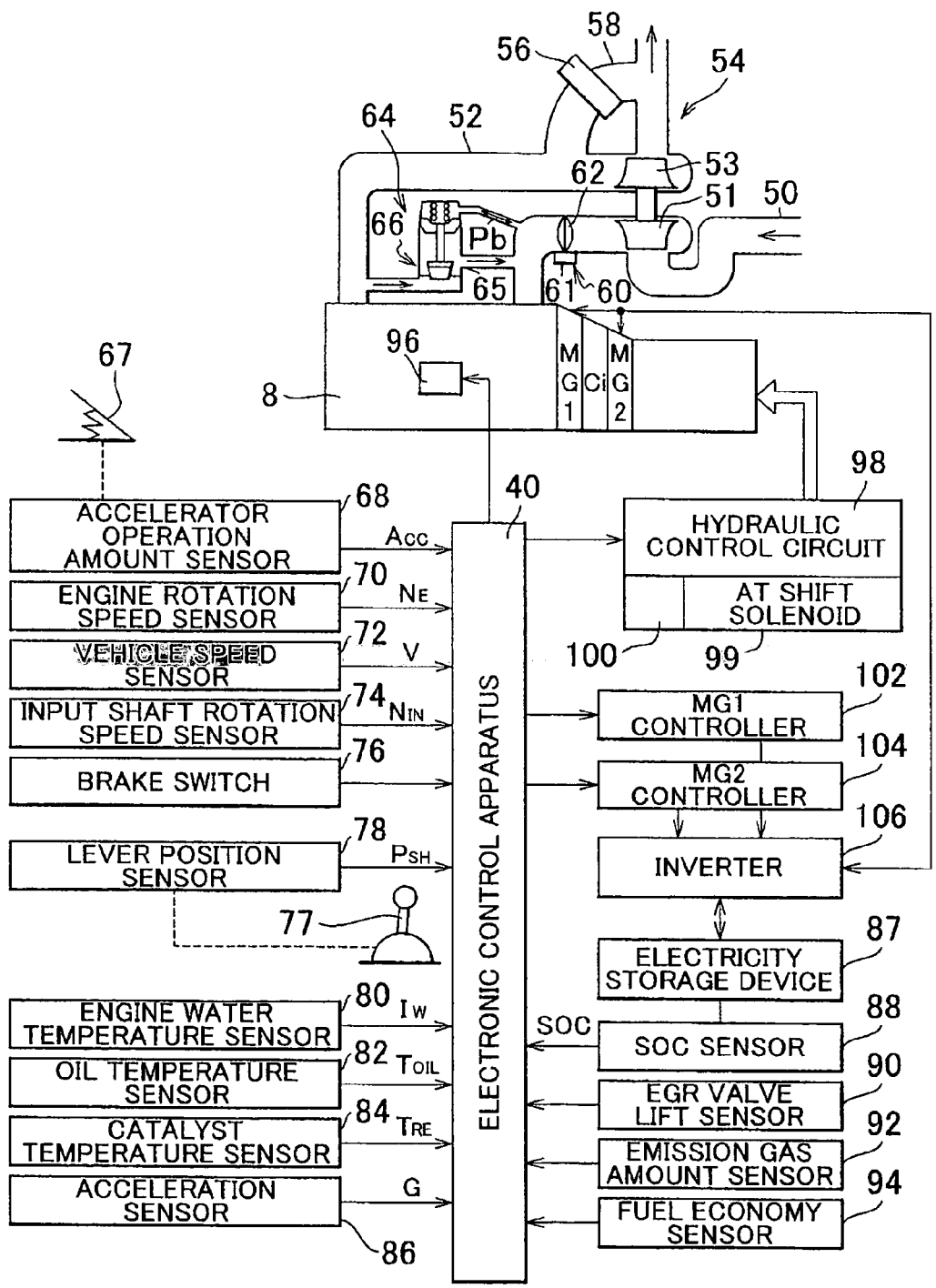

FIG. 4 is a diagram schematically illustrating the constructions of the driving apparatus 6 shown in FIG. 1 and the like, and is also a block diagram illustrating portions of a control system provided in the vehicle for controlling the driving apparatus 6 and the like. An electronic control apparatus 40 includes a so-called microcomputer having a CPU, a ROM, a RAM, an input/output interface, etc. By performing signal processing in accordance with programs stored in the ROM while using a temporary storage function of the RAM, the electronic control apparatus 40 basically performs, for example, an output control of the engine 8, a shift control of automatically switching the gear stage of the automatic transmission 10, a hybrid control of performing a powering control or a regeneration control of the first motor-generator MG1 or the second motor-generator MG2, etc. The electronic control apparatus 40 is formed of separate sections for the engine control, the shift control, the hybrid control, etc., as needed.

As shown in FIG. 4, an exhaust turbine type supercharger (hereinafter, referred to as "supercharger") 54 is provided on an intake pipe 50 and an exhaust pipe 52 of the engine 8. The supercharger 54 has a turbine impeller 53 that is rotationally driven by flow of exhaust gas in the exhaust pipe 52, and a pump impeller 51 that is provided within the intake pipe 50 for compressing the intake air taken into the engine 8 and that is coupled to the turbine impeller 53. The pump impeller 51 is rotationally driven by the turbine impeller 53. A bypass passageway 58 that has a waste gate valve 56 and bypasses the turbine impeller 53 is provided in parallel with the exhaust pipe 52. The charging pressure Pa in the intake pipe 50 is adjusted by changing the ratio between the amount of emission gas passing by the turbine impeller 53 and the emission gas amount passing through the passageway 58. Incidentally, instead of the exhaust turbine type supercharger, a mechanical pump type supercharger that is rotationally driven by the engine or an electric motor may be provided singly or in combination with an exhaust turbine type supercharger.

An intake throttle mechanism 60 is provided in the intake pipe 50. The intake throttle mechanism 60 has a throttle 62 for throttling the intake passageway, and a stepping motor 61 that opens and closes the throttle 62. For example, when the engine is started, the throttle 62 is fully opened to reduce white smoke and black smoke. When the engine is stopped, the throttle 62 is completely closed to reduce vibrations and noise.

Furthermore, an emission gas recirculation device (hereinafter, referred to as "EGR device") 64 that reduces NOx by recirculating a portion of the emission gas into the intake system and thereby decreasing the combustion temperature within the cylinders is provided between the exhaust pipe 52 and the intake pipe 50. The EGR device 64 has an EGR piping 65 that connects the exhaust pipe 52 (e.g., an exhaust manifold) and the intake pipe 50 (e.g., an intake manifold), and an EGR valve 66 provided in an intermediate portion of the EGR piping 65. The amount of opening/closure of the EGR valve 66 is controlled in accordance with the load state of the engine 8, for example, in accordance with the intake negative pressure Pb of the engine 8, so as to adjust the emission gas recirculation amount (hereinafter, referred to as "EGR amount") and the emission gas recirculation rate (hereinafter, referred to as "EGR rate"). For example, the intake negative pressure Pb of the engine 8 may be a negative pressure near the throttle valve 62 which directly acts on the EGR valve 66, or may also be controlled by a solenoid valve or the like so as to achieve an amount of opening/closure of the EGR valve 66 that brings about an optimal EGR amount and an optimal EGR rate based on the load state of the engine 8, such as the rotation speed, the output torque, etc.

Since the EGR rate (=the EGR amount/the inflow air amount) is an EGR amount with respect to the inflow air amount, the EGR amount can be univocally determined from the EGR rate through the use of the inflow air amount as a parameter. Therefore, the EGR rate in this embodiment can be converted into the EGR amount through the use of the inflow air amount as a parameter, e.g., by multiplying the EGR rate by the inflow air amount.

Figure 5:
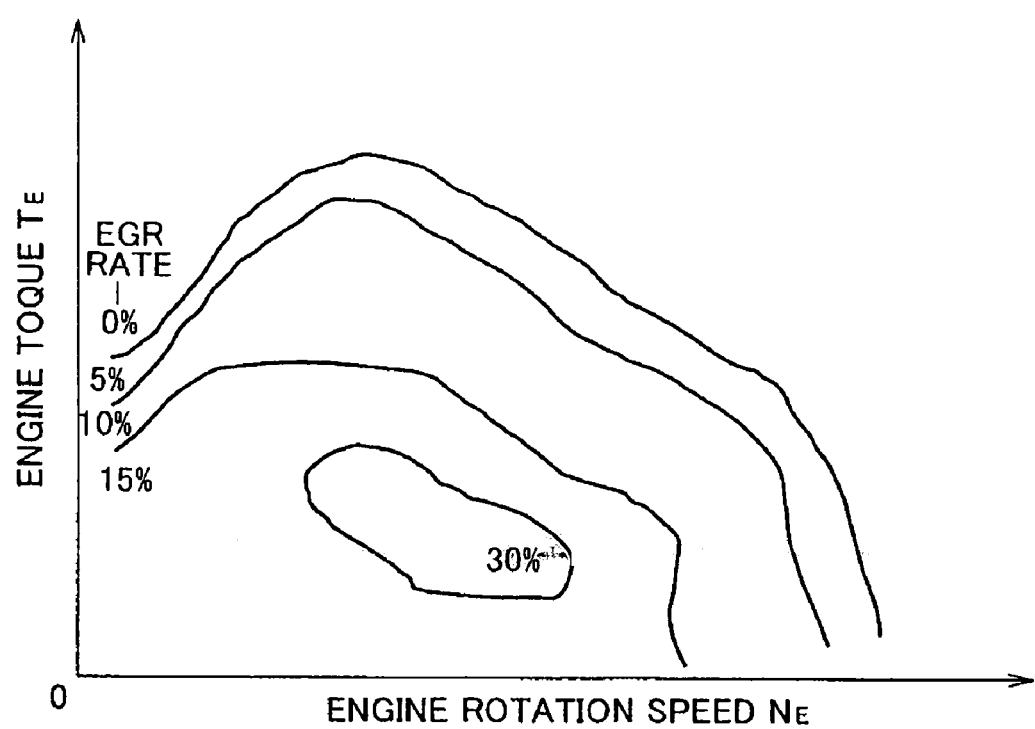
FIG. 5 is an example of an EGR rate map that is empirically determined on the basis of the load state of the engine expressed by the engine rotation speed and the engine torque, and is stored beforehand.

FIG. 5 is an example of the map (relationship) of EGR rate (hereinafter, referred to as "EGR rate map") that is empirically determined on the basis of the load state of the engine 8 represented by the engine rotation speed NE and the output torque of the engine 8 (hereinafter, referred to as "engine torque") TE, and is stored beforehand. As shown in FIG. 5, the EGR rate decreases as the engine rotation speed NE increases, or as the engine torque TE increases, that is, as the engine 8 shifts to higher load states.

Referring back to FIG. 4, various sensors, switches and the like are provided, including an accelerator operation amount sensor 68 for detecting the amount of operation ACC of an accelerator pedal 67 that is an accelerator operating member depressed in accordance with the amount of output requested by the driver, an engine rotation speed sensor 70 for detecting the engine rotation speed NE (=the rotation speed NMG1 of the first motor-generator MG1), a vehicle speed sensor 72 for detecting the vehicle speed V (corresponding to the rotation speed NOUT of the output shaft 28), an input shaft rotation speed sensor 74 for detecting the rotation speed NIN of the input shaft 16 of the automatic transmission 10 (=the rotation speed NMG2 of the second motor-generator MG2), a brake switch 76 for detecting the presence/absence of operation of a foot brake that is an ordinary-use brake, a lever position sensor 78 for detecting the lever position of a shift lever 77 (operating position) PSH, an engine water temperature sensor 80 for detecting the cooling water temperature IW of the engine 8, an oil temperature sensor 82 for detecting the operating oil temperature TOIL of the automatic transmission 10, a catalyst temperature sensor 84 for detecting the temperature TRE of a catalyst that purifies the emission gas, an acceleration sensor 86 for detecting the acceleration G of the vehicle, an SOC sensor 88 for detecting the amount of electricity stored (the remaining capacity, the amount of charge) SOC of an electricity storage device 87 connected to the motor-generators MG1, MG2, an EGR valve lift sensor 90 for detecting the amount of lift (the amount of opening/closure) of the EGR valve 66, an emission gas amount sensor 92 for detecting the amount of emission gas including $CO_2$, NOx, etc., a fuel economy sensor 94 for detecting the fuel consumption rate, etc. These sensors, switches, etc., supply the electronic control apparatus 40 with signals and the like, which indicate the accelerator operation amount Acc, the engine rotation speed NE (=the first motor-generator rotation speed NMG1), the vehicle speed V, the input shaft rotation speed NIN (=the second motor-generator rotation speed NMG2), the presence/absence of brake operation, the lever position PSH of the shift lever 77, the cooling water temperature IW, the oil temperature TOIL, the catalyst temperature TRE, the acceleration G of the vehicle, the amount of stored electricity SOC, the EGR valve lift amount, the emission gas amount, the fuel economy, etc.

The electronic control apparatus 40 outputs control signals for controlling the engine output, for example, a fuel supply amount signal that controls the amount of fuel supplied to the engine 8 by a fuel injection device 96, a charging pressure adjustment signal for adjusting the charging pressure, an electric air-conditioner device for operating an electric air-conditioner, a valve command signal for controlling the energization, de-energization, etc., of AT shift solenoids 99 disposed in a hydraulic control circuit 98, for example, linear solenoid valves SL1 to SL6 (not shown), in order to operate the hydraulic actuators of the clutches C1 to C4 and the brakes B1, B2 of automatic transmission 10, a valve command signal for controlling the energization, de-energization, etc., of a lockup clutch control valve 100 provided in the hydraulic control circuit 98 in order to operate a hydraulic actuator of the lockup clutch Ci, a control signal for controlling an inverter 106 through an MG1 controller 102 or an MG2 controller 104 for the purpose of the powering control, the power generation (regeneration) control, etc., of the first motor-generator MG1 and the second motor-generator MG2, a shift position (operating position) indication signal for operating a shift indicator, an ABS operation signal for operating an ABS actuator that prevents slippage of the tire wheels during braking, a signal for driving an electric heater, a control signal for a cruise control computer, etc.

Figure 6:
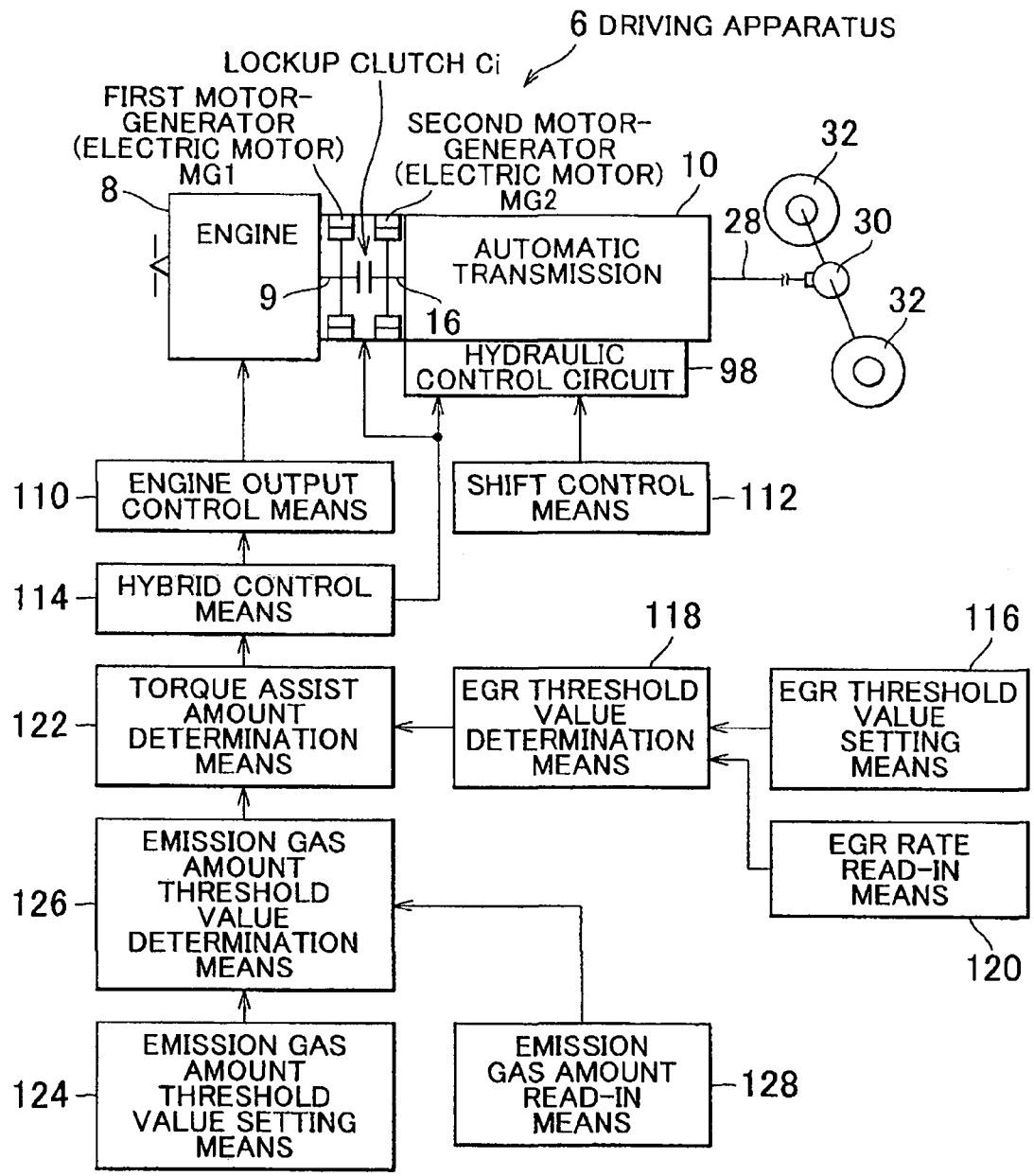
FIG. 6 is a function block diagram illustrating portions of control functions of an electronic control apparatus shown in FIG. 4.

FIG. 6 is a function block diagram illustrating portions of control functions that are provided in the electronic control apparatus 40. In FIG. 6, an engine output control means 110 executes an output control of the engine 8 by controlling the fuel injection amount FI provided the fuel injection device 96 for the purpose of the fuel injection amount control. For example, the engine output control means 110 determines the fuel injection amount FI on the basis of the engine rotation speed NE and the accelerator operation amount Acc, from a pre-stored relationship in which the fuel injection amount FI is determined by the engine rotation speed NE and the accelerator operation amount Acc as variables. Then, the engine output control means 110 executes the fuel injection amount control so that the fuel injection amount FI is reached. Furthermore, at the time of starting up the engine 8, the engine output control means 110 releases the lockup clutch Ci through the use of the lockup clutch control valve 100 provided in the hydraulic control circuit 98, and rotationally drives (cranks) the crankshaft 9 of the engine 8 by operating the first motor-generator MG1 as an electric motor via the MG1 controller 102.

A shift control means 112 judges a speed change stage (gear stage) to be set by the automatic transmission 10, for example, from the actual vehicle speed V and the accelerator operation amount Acc on the basis of a pre-stored relationship (shift map, shift chart) in which the vehicle speed V and the accelerator operation amount Acc are used as parameters. Then, in order to achieve the speed change stage selected, the shift control means 112 outputs a shift command (shift output) to the hydraulic control circuit 98, for example, on the basis of the engagement operation table of FIG. 3 to execute the shift control of automatically switching the speed change stage of the automatic transmission 10.

The hydraulic control circuit 98, in accordance with the shift command by the shift control means 112, executes the energization, de-energization and electric current control of the linear solenoid valves SL1 to SL6 to switch the engaged or disengaged states of the clutches C1 to C4 and the brakes B1, B2 so that a certain forward speed change stage of the first speed change stage "1st" to the eighth speed change stage "8th", or a certain reverse gear speed of the reverse speed change stages "Rev1" and "Rev2" is established. At the same time, the hydraulic control circuit 98 controls the transition oil pressure during the shift process. For example, for the 4th-to-5th upshift, the release transition oil pressure on the clutch C4 and the engagement transition oil pressure on the clutch C2 are controlled so as to release the clutch C4 and engage the clutch C2, as can be seen from the engagement operation table of FIG. 3. It is to be noted herein that various manners of shift control are possible, for example, a shift control based on the accelerator operation amount Acc, the road surface slope, etc.

A hybrid control means 114 executes an opening/closing control of the lockup clutch Ci, the powering control and the regeneration control of the first motor-generator MG1 and the second motor-generator MG2, etc., in order to run the vehicle in a plurality of operation modes that are different in the operation states of the engine 8 and the motor-generators MG1, MG2, such as a motor run, an engine run, a motor-and-engine run, etc., in accordance with the state of running of the vehicle. FIG. 7 shows an example set of such operation modes normally adopted.

Referring to FIG. 7, during the engine run mode where the vehicle is run by using solely the engine 8 as a vehicle-running driving power source, the hybrid control means 114 outputs a command to the hydraulic control circuit 98 so that the lockup clutch Ci is engaged through the use of the lockup clutch control valve 100 to directly transfer the output of the engine 8 to the input shaft 16 of the automatic transmission 10, and also outputs a command to the engine output control means 110 so that the engine 8 generates a necessary driving power to run the vehicle. The engine run mode is selected, for example, for running of the vehicle in the case where the remaining capacity SOC of the electricity storage device 76 is becoming low, or running of the vehicle where greater driving power is needed than in the motor run mode. Furthermore, in the case where the remaining capacity SOC of the electricity storage device 87 is low, or the like, the hybrid control means 114 outputs a command to the MG1 controller 102 so that the first motor-generator MG1 is put into a power generating (regeneration) state and the generated energy ED is stored into the electricity storage device 87, as needed.

Furthermore, during the motor launch/run mode where the vehicle is launched and run by using solely the second motor-generator MG2 as a vehicle-running driving power source, the hybrid control means 114 outputs a command to the hydraulic control circuit 98 so that the lockup clutch Ci is released through the use of the lockup clutch control valve 100 to disconnect the power transfer path between the engine 8 and the automatic transmission 10, and also outputs a command to the MG2 controller 104 so that driving current is supplied from the inverter 106 to put the second motor-generator MG2 into the powering state and, therefore, the second motor-generator MG2 generates necessary driving power to run the vehicle. The motor launch/run mode is selected for, for example, a quiet launch or run of the vehicle. Since during this mode, the power transfer path between the engine 8 and the automatic transmission 10 is in the disconnected state, degraded fuel economy due to the dragging of the engine 8 not being in operation is substantially avoided. Furthermore, in the case where the remaining capacity SOC of the electricity storage device 87 is low, or the like, the hybrid controller means 114 outputs a command to the engine output control means 110 so as to operate the engine 8, and also outputs a command to the MG1 controller 102 so that the first motor-generator MG1 is put into the power generating state and the generated power ED is stored into the electricity storage device 87. The generated energy ED may also be directly supplied as driving current to the second motor-generator MG2 via the inverter 106.

During the engine+motor run mode where the vehicle is run by using the engine 8 and the second motor-generator MG2 as vehicle-running driving power sources, the hybrid control means 114 outputs a command to the hydraulic control circuit 98 so that the lockup clutch Ci is engaged through the use of the lockup clutch control valve 100 to directly transfer the output of the engine 8 to the input shaft 16 of the automatic transmission 10, and also outputs a command to the engine output control means 110 so that the engine 8 generates necessary driving power to run the vehicle, and also outputs a command to the MG2 controller 104 so that driving current is supplied from the inverter 106 to put the second motor-generator MG2 into the powering state and, therefore, the second motor-generator MG2 generates necessary driving power to run the vehicle. The engine+motor run mode is selected, for example, for an accelerating run. Furthermore, the hybrid control means 114 may also output a command to the MG1 controller 102 so that driving current is supplied from the inverter 106 to put the first motor-generator MG1 into the powering state and the first motor-generator MG1 generates driving power to run the vehicle. Thus, the first motor-generator MG1 and the second motor-generator MG2 function as a second driving power source for assisting the engine 8 in the output of driving power.

As mentioned above, as the engine 8 shifts to higher load states, the EGR rate normally decreases so that the amount of emission of NOx (oxides of nitrogen) cannot be reduced.

Therefore, in this embodiment, the output of the first motor-generator MG1 and/or the second motor-generator MG2 is used as driving power in addition to the output of the engine 8 in order to run the vehicle. Therefore, the output of the engine 8 can be reduced by an amount corresponding to the driving power provided by the first motor-generator MG1 and/or the second motor-generator MG2, that is, the engine 8 is kept in a relatively low load state by the torque assist, so as to curb reduction of the EGR rate.

Specifically, in addition to the foregoing functions, the hybrid control means 114 functions as a second driving power source control means for assisting the engine 8 in the output of driving power through the use of the first motor-generator MG1 and/or the second motor-generator MG2, so as to make the EGR rate achieved by the EGR device 64 greater than or equal to a first EGR rate, that is, an EGR rate threshold value, which is a predetermined EGR rate that is an EGR rate criterion value determined on the basis of the load state of the engine 8.

An EGR rate threshold value setting means 116 sets an EGR rate threshold value for the execution of the torque assist by the hybrid control means 114 through the use of the first motor-generator MG1 and/or the second motor-generator MG2. Hereinafter, an example of the setting of the EGR rate threshold value by the EGR rate threshold value setting means 116 will be described.

Figure 8:
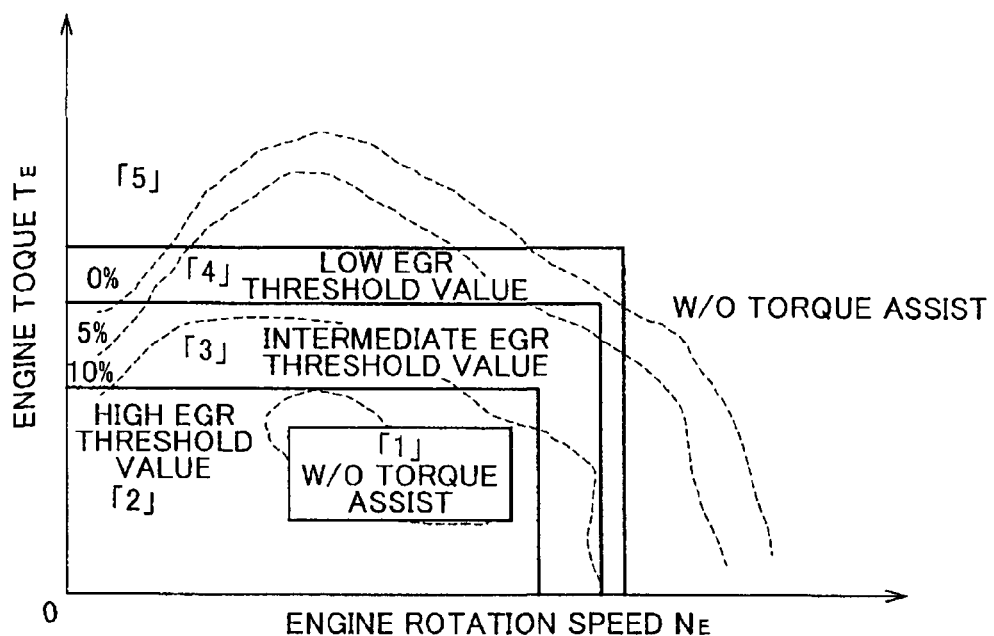
FIG. 8 is a diagram exemplifying the setting of EGR rate threshold values, which is superimposed over an EGR rate map as shown in FIG. 5.

FIG. 8 is a diagram exemplifying the setting of EGR rate threshold values, which is superimposed over the EGR rate map of FIG. 5 indicated by broken lines. In FIG. 8, in an engine load region where the EGR rate is sufficiently high, that is, at least 30%, for example, in a region "1" surrounded by a solid line, the EGR rate is basically high, so that the torque assist is not needed. Therefore, in such a region, the EGR rate threshold value setting means 116 does not set an EGR rate threshold value for execution of the torque assist.

In an engine load region where the EGR rate becomes as high as at least 15%, for example, in a region "2" surrounded by a solid line, the EGR rate is basically high to some degree and a certain EGR rate can be secured by the torque assist. Therefore, in this region, the EGR rate threshold value setting means 116 sets the EGR rate threshold value at a high value, for example, about 20%, for execution of more torque assist.

In an engine load region where the EGR rate is at an intermediate level of 5 to 15%, for example, in a region "3" surrounded by a solid line, the EGR rate is at a certain level although it is lower than in the region "2", and a certain level of EGR rate can be secured by the torque assist. Therefore, in this region, the EGR rate threshold value setting means sets the EGR rate threshold value at an intermediate level, for example, about 10%, for execution of the torque assist.

In an engine load region where the EGR rate is as low as at most 5%, for example, in a region "4" surrounded by a solid line, the EGR rate is basically low, so that execution of the torque assist will not considerably improve the EGR rate. Therefore, in this region, the EGR rate threshold value setting means 116 sets the EGR rate threshold value at a low level, for example, about 3%, so as to reduce the torque assist.

In an engine load region where the EGR rate is extremely low, that is, 0 to several %, for example, in a region "5" defined by a solid line, the EGR rate is basically very low, so that the torque assist has substantially no influence (effect) and, therefore, the torque assist is not executed. Therefore, in this region, the EGR rate threshold value setting means 116 does not set an EGR rate threshold value for execution of the torque assist.

Thus, in order to maintain a low load state of the engine 8 by the torque assist and, therefore, curb reduction of the EGR rate, the EGR rate threshold values are determined on the basis of the load states of the engine 8, that is, the region "2", the region "3" and the region "4".

In a region, such as the region "1", where the EGR rate is basically high and, therefore, the torque assist is not needed, a second EGR rate greater than the EGR rate threshold value (first EGR rate) may be determined, and execution of the torque assist may be omitted if the actual EGR rate is greater than or equal to the second EGR rate. Specifically, the hybrid control means 114, in addition to the foregoing functions, omits the assist for the engine 8 in the output of driving power performed through the use of the first motor-generator MG1 and/or the second motor-generator MG2, if the EGR rate achieved by the EGR device 64 is greater than or equal to the second EGR rate that is set greater than the first EGR rate. For example, the EGR rate threshold value setting means 116 sets the second EGR rate at about 30%, which is greater than the EGR rate threshold value set for the region "2".

An EGR threshold value determination means 118 determines whether or not the actual EGR rate is less than or equal to the EGR rate threshold value (first EGR rate) set by the EGR rate threshold value setting means 116. Furthermore, an EGR rate read-in means 120 reads in an EGR rate map, for example, the one as shown in FIG. 5, and reads in an EGR rate as the aforementioned actual EGR rate from the EGR rate map on the basis of the actual engine rotation speed NE and the actual engine torque TE. The actual engine torque TE is computed by the EGR rate read-in means 120, for example, from an empirically determined and pre-stored relationship between the engine rotation speed NE and the estimated engine torque TE' with the fuel injection amount FI used as a parameter, on the basis of the actual fuel injection amount FI and the actual engine rotation speed NE.

If the EGR threshold value determination means 118 determines that the actual EGR rate is less than or equal to the EGR rate threshold value, a torque assist amount determination means 122 sets a torque assist amount for the execution of the torque assist by the hybrid control means 114 through the use of the first motor-generator MG1 and the second motor-generator MG2 such that the actual EGR rate becomes greater than or equal to the EGR rate threshold value.

Figure 9:
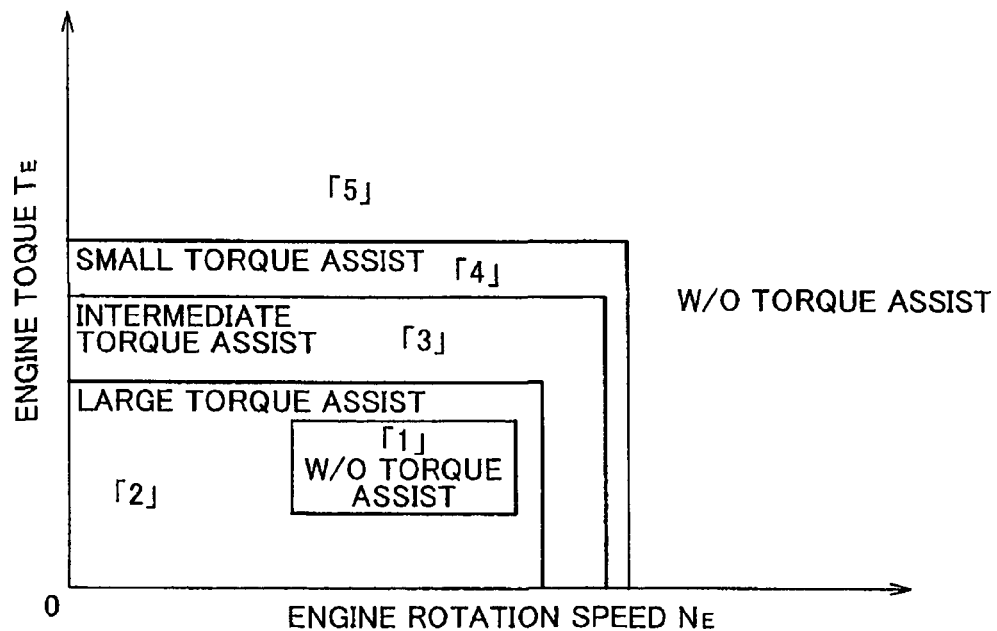
FIG. 9 shows an example of the setting of torque assist amounts for a torque assist performed through the use of a first motor-generator and/or a second motor-generator so that the EGR rate becomes greater than or equal to the EGR rate threshold value.

FIG. 9 shows an example of the setting of torque assist amounts for the torque assist performed by the hybrid control means 114 through the use of the first motor-generator MG1 and/or the second motor-generator MG2. For example, a region "2", a region "3" and a region "4" surrounded by solid lines in FIG. 9 correspond to the region "2", the region "3" and the region "4", respectively, of FIG. 8. The torque assist amount determination means 122 sets the torque assist amounts for the regions "2" to "4" of FIG. 9 so that in any of the regions "2" to "4" of FIG. 8, the actual EGR rate will be greater than or equal to the EGR rate threshold value (first EGR rate) of that region. For example, in the region "2" of FIG. 8 in which the EGR rate threshold value is high, the torque assist amount is set large, as shown in the region "2" of FIG. 9. In the region "4" of FIG. 8 in which the EGR rate threshold value is low, the torque assist amount is set small, as shown in the region "4" of FIG. 9.

In the region "1" and the region "5" surrounded by solid lines in FIG. 9 corresponding to the region "1" and the region "5" of FIG. 8, the torque assist is not executed, so that the torque assist amount determination means 122 does not set a torque assist amount or sets it at zero.

Then, the hybrid control means 114 executes the torque assist through the use of the first motor-generator MG1 and/or the second motor-generator MG2 so that the torque assist set by the torque assist amount determination means 122 is achieved.

Figure 10:
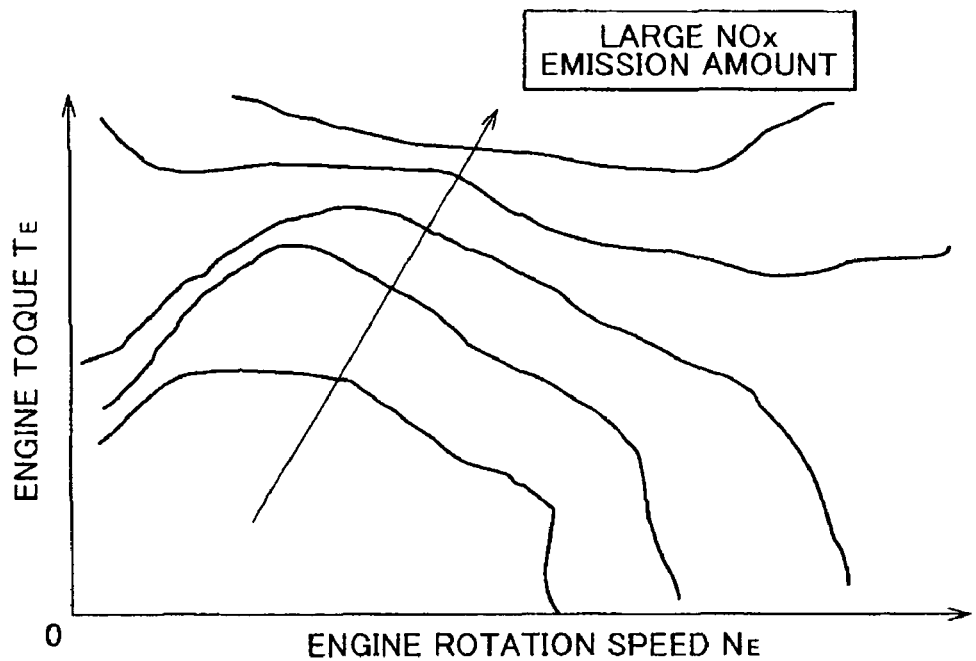
FIG. 10 is an example of a map of the NOx emission amount that is empirically determined on the basis of the load state of the engine expressed by the engine rotation speed and the engine torque and is stored beforehand.

FIG. 10 is an example of a map (relationship) of the emission amount [g/sec] of NOx, a kind of emission gas, for the engine 8 of this embodiment, which is empirically determined on the basis of the load state of the engine 8 expressed by the engine rotation speed NE and the engine torque TE and is stored beforehand (hereinafter, referred to as "NOx emission amount map"). As shown in FIG. 10, the emission amount of NOx increases as the engine rotation speed NE becomes higher or the engine torque TE becomes higher, that is, as the engine 8 shifts to higher load states.

Figure 11:
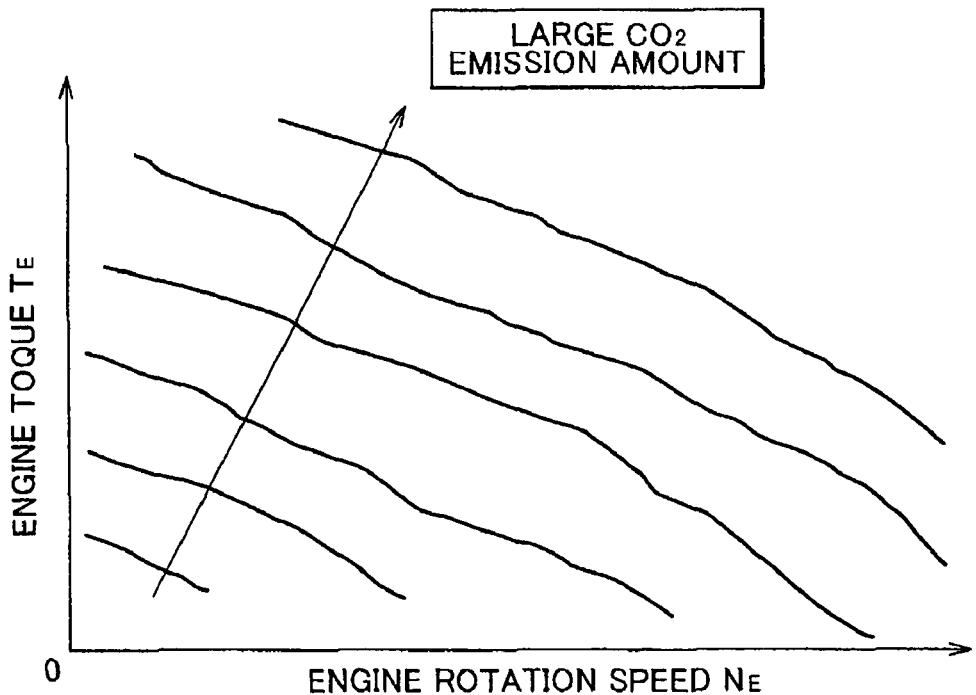
FIG. 11 is an example of a map of the $CO_2$ emission amount that is empirically determined on the basis of the load state of the engine expressed by the engine rotation speed and the engine torque and is stored beforehand.

FIG. 11 is an example of a map (relationship) of the emission amount [g/sec] of $CO_2$, a kind of emission gas, regarding the engine 8 of this embodiment, which is empirically determined on the basis of the load state of the engine 8 expressed by the engine rotation speed NE and the engine torque TE and is stored beforehand (hereinafter, referred to as "$CO_2$ emission amount map"). As shown in FIG. 11, the emission amount of $CO_2$ increases as the engine rotation speed NE becomes higher or the engine torque TE becomes higher, that is, as the engine 8 shifts to higher load states.

Thus, the emission amount of emission gases, such as NOx, $CO_2$, etc., increases as the engine 8 shifts to higher load states. Therefore, in this embodiment, in addition to the output of the engine 8, the output of the first motor-generator MG1 and/or the second motor-generator MG2 is used as driving power to run the vehicle, so that the output of the engine 8 is reduced by an amount corresponding to the driving power provided by the first motor-generator MG1 and/or the second motor-generator MG2. That is, by performing the torque assist, the engine 8 is kept in a low load state, so as to reduce the amount of emission gas.

Specifically, in addition to or instead of the aforementioned functions, the hybrid control means 114 assists the engine 8 in the output of driving power through the use of the first motor-generator MG1 and/or the second motor-generator MG2 so that the amount of emission gas of the engine 8 is made less than or equal to a first emission gas amount as a predetermined emission gas amount determined on the basis of the load state of the engine 8, that is, an emission gas amount threshold value.

An emission gas amount threshold value setting means 124 sets an emission gas amount threshold value for the execution of the torque assist by the hybrid control means 114 through the first motor-generator MG1 and/or the second motor-generator MG2. Hereinafter, an example of the setting of emission gas amount threshold values by the emission gas amount threshold value setting means 124 will be described.

Figure 12:
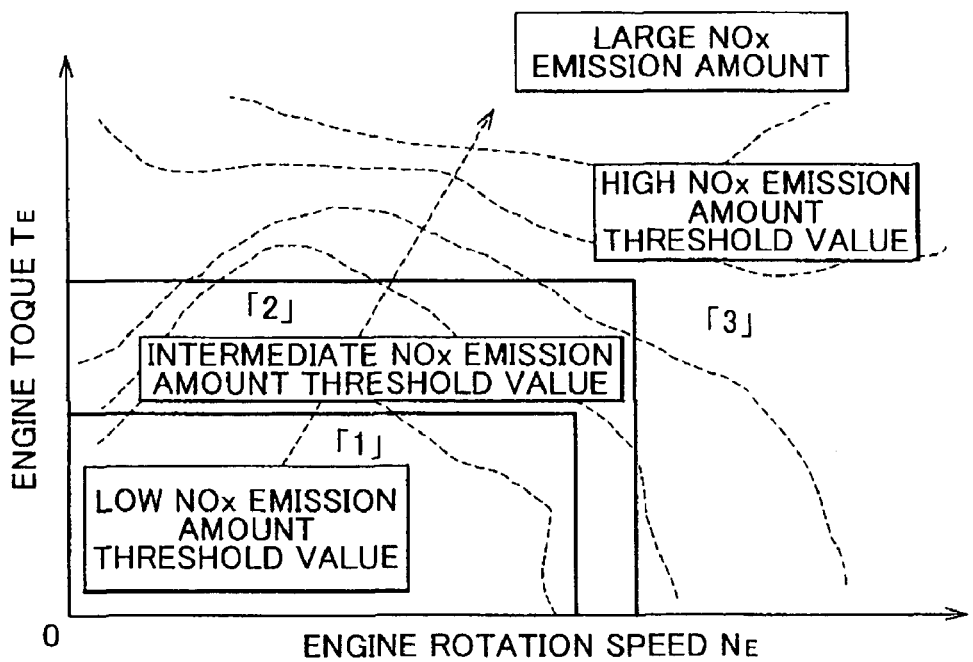
FIG. 12 is a diagram exemplifying the setting of NOx emission amount threshold values, which is superimposed over a NOx emission amount map as shown in FIG. 10.

FIG. 12 is a diagram exemplifying the setting of first NOx emission amounts as predetermined NOx emission amounts, that is, NOx emission amount threshold values, which is superimposed over the NOx emission amount map indicated by broken lines in FIG. 10. In an engine load state where the NOx emission amount is small, for example, a region "1" demarcated by a solid line, the emission gas amount threshold value setting means 124 sets the NOx emission amount threshold value at a low level in order to execute the torque assist although it is the region where the NOx emission amount is small. In an engine load state where the NOx emission amount increases, such as the region "2" or the region "3" demarcated by solid lines, the emission gas amount threshold value setting means 124 sets the NOx emission amount threshold value higher as the NOx emission amount increases in comparison with the region "1", in order to execute the torque assist in accordance with the amount of emission of NOx. Incidentally, during an engine load state within the region "1" where the NOx emission amount is extremely small, the NOx emission amount is basically small and the torque assist is not needed. Therefore, in this region, the emission gas amount threshold value setting means 124 does not need to set a NOx emission amount threshold value for executing the torque assist. During an engine load state in the region "3" where the NOx emission amount is extremely large, the NOx emission amount is basically large and the torque assist has substantially no influence (effect) and, therefore, the torque assist is not performed. Therefore, the emission gas amount threshold value setting means 124 does not need to set a NOx emission amount threshold value for executing the torque assist.

Thus, in order to reduce the NOx emission amount by keeping the engine 8 in a low load state through the torque assist, NOx emission amount threshold values are determined on the basis of the load states of the engine 8, that is, the region "1", the region "2" and the region "3".

Furthermore, in a region within the region "1" where the NOx emission amount is extremely small and the torque assist is not needed, a second NOx emission amount smaller than the NOx emission amount threshold value (first NOx emission amount) set for the region "1" may be determined, and execution of the torque assist may be omitted if the actual NOx emission amount is less than or equal to the second NOx emission amount. Specifically, in addition to the foregoing functions, the hybrid control means 114 omits the assist for the engine 8 in the output of driving power performed through the use of the first motor-generator MG1 and/or the second motor-generator MG2 if the amount of emission gas of the engine 8 is less than or equal to the second NOx emission amount that is set smaller than the NOx emission amount threshold value set for the region "1".

Figure 13:
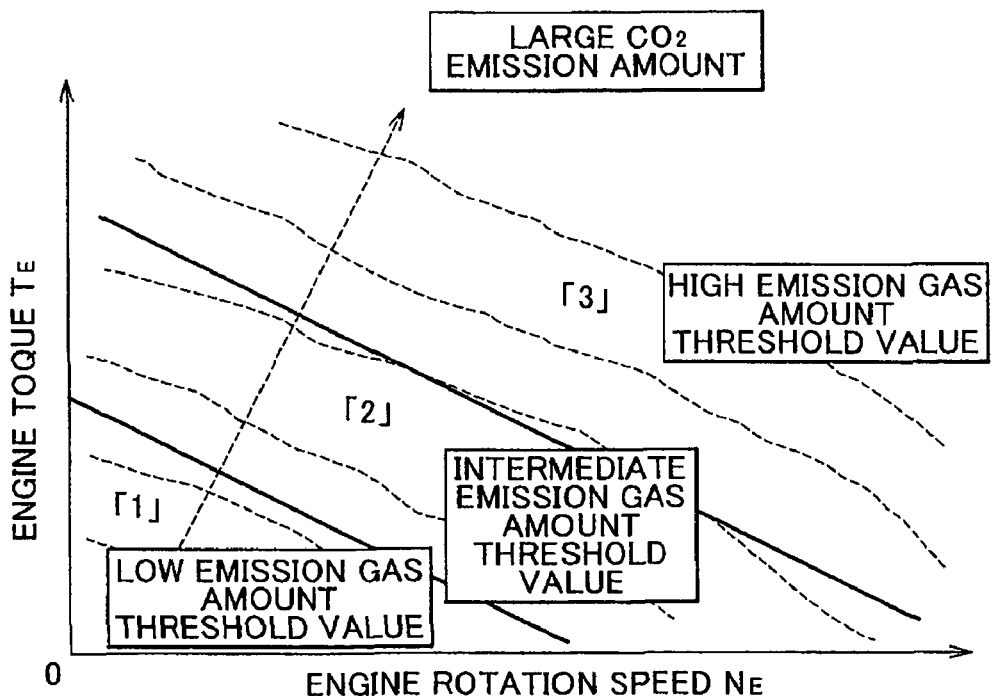
FIG. 13 is a diagram exemplifying the setting of $CO_2$ emission amount threshold values, which is superimposed over a $CO_2$ emission amount map as shown in FIG. 11.

FIG. 13 is a diagram exemplifying the setting of first $CO_2$ emission amounts as predetermined $CO_2$ emission amounts, that is, $CO_2$ emission amount threshold values, which is superimposed over the $CO_2$ emission amount map indicated by broken lines in FIG. 11. In an engine load state where the $CO_2$ emission amount is small, for example, a region "1" demarcated by a solid line, the emission gas amount threshold value setting means 124 sets the $CO_2$ emission amount threshold value at a low level in order to execute the torque assist although it is the region where the $CO_2$ emission amount is small. In an engine load state where the $CO_2$ emission amount increases, such as the region "2" or the region "3" demarcated by solid lines, the emission gas amount threshold value setting means 124 sets the $CO_2$ emission amount threshold value higher as the $CO_2$ emission amount increases in comparison with the region "1", in order to execute the torque assist in accordance with the amount of emission of $CO_2$. Incidentally, during an engine load state within the region "1" where the $CO_2$ emission amount is extremely small, the $CO_2$ emission amount is basically small and the torque assist is not needed. Therefore, in this region, the emission gas amount threshold value setting means 124 does not need to set a $CO_2$ emission amount threshold value for executing the torque assist. During an engine load state within the region "3" where the $CO_2$ emission amount is extremely large, the $CO_2$ emission amount is basically large and the torque assist has substantially no influence (effect) and, therefore, the torque assist is not performed. Therefore, the emission gas amount threshold value setting means 124 does not need to set a $CO_2$ emission amount threshold value for executing the torque assist.

Thus, in order to reduce the $CO_2$ emission amount by keeping the engine 8 in a low load state through the torque assist, $CO_2$ emission amount threshold values are determined on the basis of the load states of the engine 8, that is, the region "1", the region "2" and the region "3".

Furthermore, in a region within the region "1" where the $CO_2$ emission amount is extremely small and the torque assist is not needed, a second $CO_2$ emission amount smaller than the $CO_2$ emission amount threshold value (first $CO_2$ emission amount) set for the region "1" may be determined, and execution of the torque assist may be omitted if the actual $CO_2$ emission amount is less than or equal to the second $CO_2$ emission amount. Specifically, in addition to the foregoing functions, the hybrid control means 114 omits the assist for the engine 8 in the output of driving power performed through the use of the first motor-generator MG1 and/or the second motor-generator MG2 if the amount of emission gas of the engine 8 is less than or equal to the second $CO_2$ emission amount that is set smaller than the $CO_2$ emission amount threshold value set for the region "1".

An emission gas amount determination means 126 determines whether or not the actual emission gas amount is greater than or equal to the emission gas amount threshold value set by the emission gas amount threshold value setting means 124. For example, the emission gas amount determination means 126 determines whether or not the actual NOx emission amount is greater than or equal to the NOx emission amount threshold value set by the emission gas amount threshold value setting means 124. Furthermore, the emission gas amount determination means 126 determines whether or not the actual $CO_2$ emission amount is greater than or equal to the $CO_2$ emission amount threshold value set by the emission gas amount threshold value setting means 124.

An emission gas amount read-in means 128 reads in, for example, a map (relationship) of the emission gas amount that is empirically determined on the basis of the load state of the engine 8 expressed by the engine rotation speed NE and the engine torque TE (hereinafter, referred to as "emission gas amount map") and is stored beforehand. Then, the emission gas amount read-in means 128 reads in an emission gas amount as the actual emission gas amount from the emission gas amount map on the basis of the engine rotation speed NE and the engine torque TE. For example, the emission gas amount read-in means 128 reads in, for example, a NOx emission amount map as shown in FIG. 10, and reads in a NOx emission amount as the actual NOx emission amount from the NOx emission amount map on the basis of the engine rotation speed NE and the engine torque TE. Furthermore, the emission gas amount read-in means 128 reads in, for example, a $CO_2$ emission amount map as shown in FIG. 11, and reads in a $CO_2$ emission amount as the actual $CO_2$ emission amount from the $CO_2$ emission amount map on the basis of the engine rotation speed NE and the engine torque TE. The actual engine torque TE is computed by the emission gas amount read-in means 128, for example, from an empirically determined and pre-stored relationship between the engine rotation speed NE and the estimated engine torque TE' with the fuel injection amount FI used as a parameter, on the basis of the actual fuel injection amount FI and the actual engine rotation speed NE.

If the emission gas amount determination means 126 determines that the actual emission gas amount is greater than or equal to the emission gas amount threshold value, the torque assist amount determination means 122 sets a torque assist amount for the execution of the torque assist by the hybrid control means 114 through the use of the first motor-generator MG1 and the second motor-generator MG2 such that the actual emission gas amount becomes less than or equal to the emission gas amount threshold value.

For example, the torque assist amount determination means 122 sets torque assist amounts individually for the regions "1" to "3" of FIG. 12 so that in any of the regions "1" to "3" of FIG. 12, the actual NOx emission amount will be less than or equal to the NOx emission amount threshold value of that region. Furthermore, the torque assist amount determination means 122 sets torque assist amounts individually for the regions "1" to "3" of FIG. 13 so that in any of the regions "1" to "3" of FIG. 13, the actual $CO_2$ emission amount is less than or equal to the $CO_2$ emission amount threshold value of that region.

If the torque assist is omitted in a region where the emission gas amount is extremely small and a region where the emission gas amount is extremely large, the torque assist amount determination means 122 does not set a torque assist amount or sets it at zero. For example, if the torque assist is omitted in a region within the region "1" of FIG. 12 where the NOx emission amount is extremely small and a region within the region "3" where the NOx emission amount is extremely large, the torque assist amount determination means 122 does not set a torque assist amount or sets it at zero. Furthermore, if the torque assist is omitted in a region within the region "1" of FIG. 12 where the $CO_2$ emission amount is extremely small and a region within the region "3" where the $CO_2$ emission amount is extremely large, the torque assist amount determination means 122 does not set a torque assist amount or sets it at zero.

Figure 14:
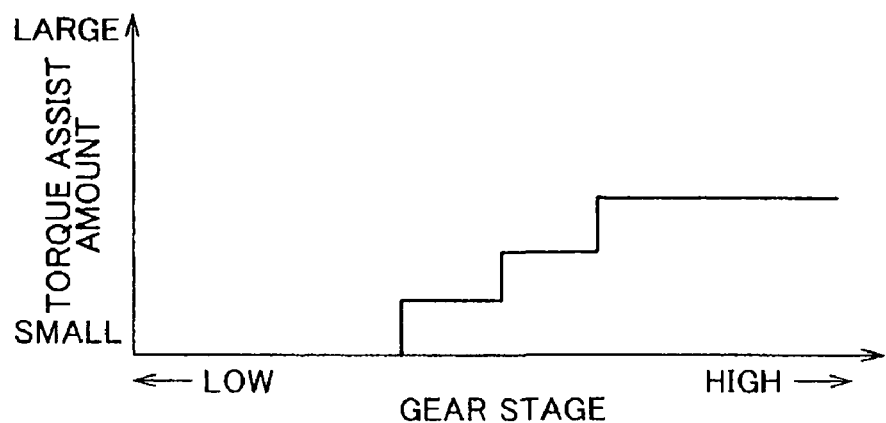
FIG. 14 shows an example of the setting of the torque assist amount based on the actual speed change stage of the automatic transmission.

The torque assist amount determination means 122 may sets the torque assist amount for the torque assist performed by the hybrid control means 114 through the first motor-generator MG1 and/or the second motor-generator MG2, on the basis of the actual speed change stage (gear stage) of the automatic transmission 10. FIG. 14 shows an example of the setting of the torque assist amount based on the actual speed change stage (gear stage) of the automatic transmission 10. As shown in FIG. 14, the torque assist amount is set so as to increase as the gear stage of the automatic transmission 10 shifts to higher speed-side gear stages (higher gears), since as the gear stage shifts to higher speed-side stages, the load state of the engine 8 at a given vehicle speed, for example, in an accelerating condition, becomes more severe.

Figure 15:
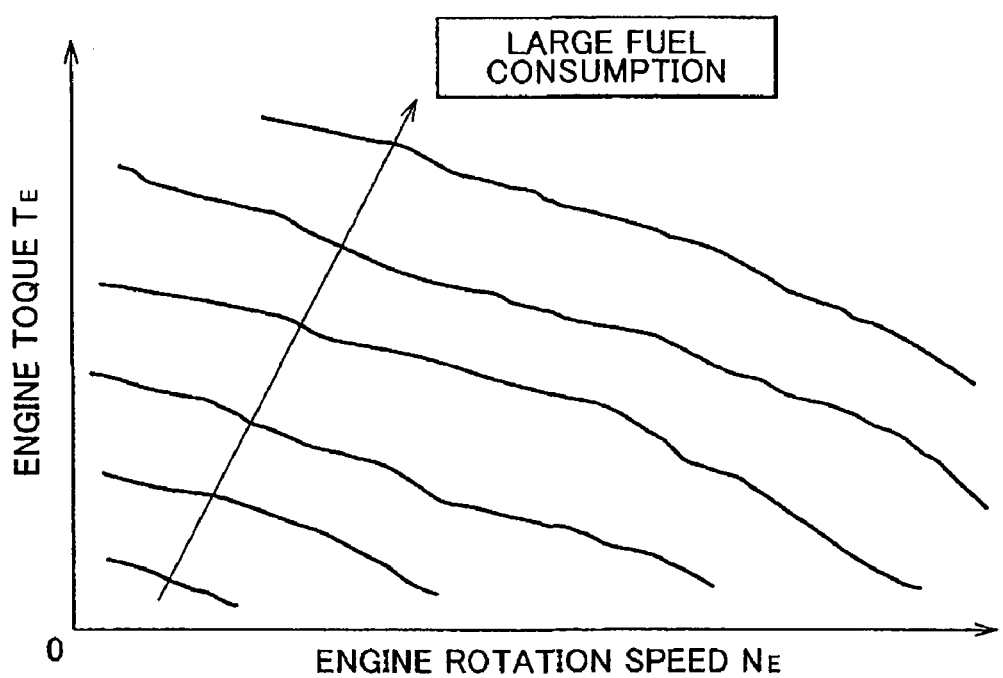
FIG. 15 shows an example of a fuel economy map which is empirically determined on the basis of the load state of the engine expressed by the engine rotation speed and the engine torque and is stored beforehand.

FIG. 15 shows an example of a map (relationship) of the fuel consumption amount, for the engine 8 of this embodiment, which is empirically determined on the basis of the load state of the engine 8 expressed by the engine rotation speed NE and the engine torque TE and is stored beforehand (hereinafter, referred to as "fuel economy map"). As shown in FIG. 15, the fuel combustion amount becomes greater as the engine rotation speed NE becomes higher or the engine torque TE becomes higher, that is, as the engine 8 shifts to higher-load states.

Thus, as the engine 8 shifts to higher-load states, the fuel consumption amount becomes greater, similarly to the emission amount of emission gases, such as $CO_2$, and the like. Therefore, in this embodiment, in addition to the output of the engine 8, the output of the first motor-generator MG1 and/or the second motor-generator MG2 may be used as driving power to run the vehicle, so that the output of the engine 8 is reduced by an amount corresponding to the driving power provided by the first motor-generator MG1 and/or the second motor-generator MG2. That is, by performing the torque assist, the engine 8 may be kept in a low load state, so as to reduce the fuel consumption amount similarly to the emission gas amount.

Specifically, in addition to or instead of the aforementioned functions, the hybrid control means 114 may add to the output of the engine 8 through the use of the first motor-generator MG1 and/or the second motor-generator MG2 so that the amount of fuel consumed by the engine 8 is made less than or equal to a predetermined fuel consumption amount that is determined beforehand on the basis of the load state of the engine 8. That is, the hybrid control means 114 may execute the torque assist taking into consideration the fuel economy map as shown in FIG. 15, similarly to the execution of the torque assist taking into consideration the $CO_2$ emission amount map as shown in FIG. 11. In this manner, too, an effect similar to that of the torque assist taking into consideration the $CO_2$ emission amount can be achieved. The description taking the fuel economy map into consideration is merely a description obtained by replacing the $CO_2$ emission amount with the fuel consumption amount in the description of the torque assist taking the foregoing $CO_2$ emission amount map. Thus, detailed description thereof is omitted.

The shift control means 112 may also perform the following function in addition to the foregoing functions. That is, if the torque assist cannot be achieved by the hybrid control means 114 through the use of the first motor-generator MG1 and/or the second motor-generator MG2 in order to make the EGR rate achieved by the EGR device 64 greater than or equal to the aforementioned EGR rate threshold value or make the emission gas amount from the engine 8 less than or equal to the aforementioned emission gas amount threshold value, the shift control means 112 may function as a power transfer state control means for controlling the power transfer state of a power transfer device so that reduction in the driving torque on the driving wheels 32 can be curbed even if the output of the engine 8 decreases.

For example, if the torque assist cannot be achieved by the hybrid control means 114, the shift control means 112 may switch the gear stage of the automatic transmission 10 to a lower speed-side gear stage (lower gear) so that even if the output of the engine 8 decreases, reduction in the driving torque on the driving wheels 32 will be curbed. Therefore, since the load state of the engine 8 at a given vehicle speed, for example, in an accelerating condition, can become lower as the gear stage of the automatic transmission 10 shifts to a lower speed-side gear stage, effects of curbing reduction of the EGR rate and curbing the emission gas amount can be achieved.

Furthermore, in the case where the torque assist by the hybrid control means 114 cannot be performed, various causes can be conceived; for example, shortage in SOC of the electricity storage device 87, a failure in an electrical system that includes the first motor-generator MG1 and the second motor-generator MG2, a functional degradation in the electrical system due to very low temperature such as low output of the first motor-generator MG1 or the second motor-generator MG2, or the like.

Figure 16:
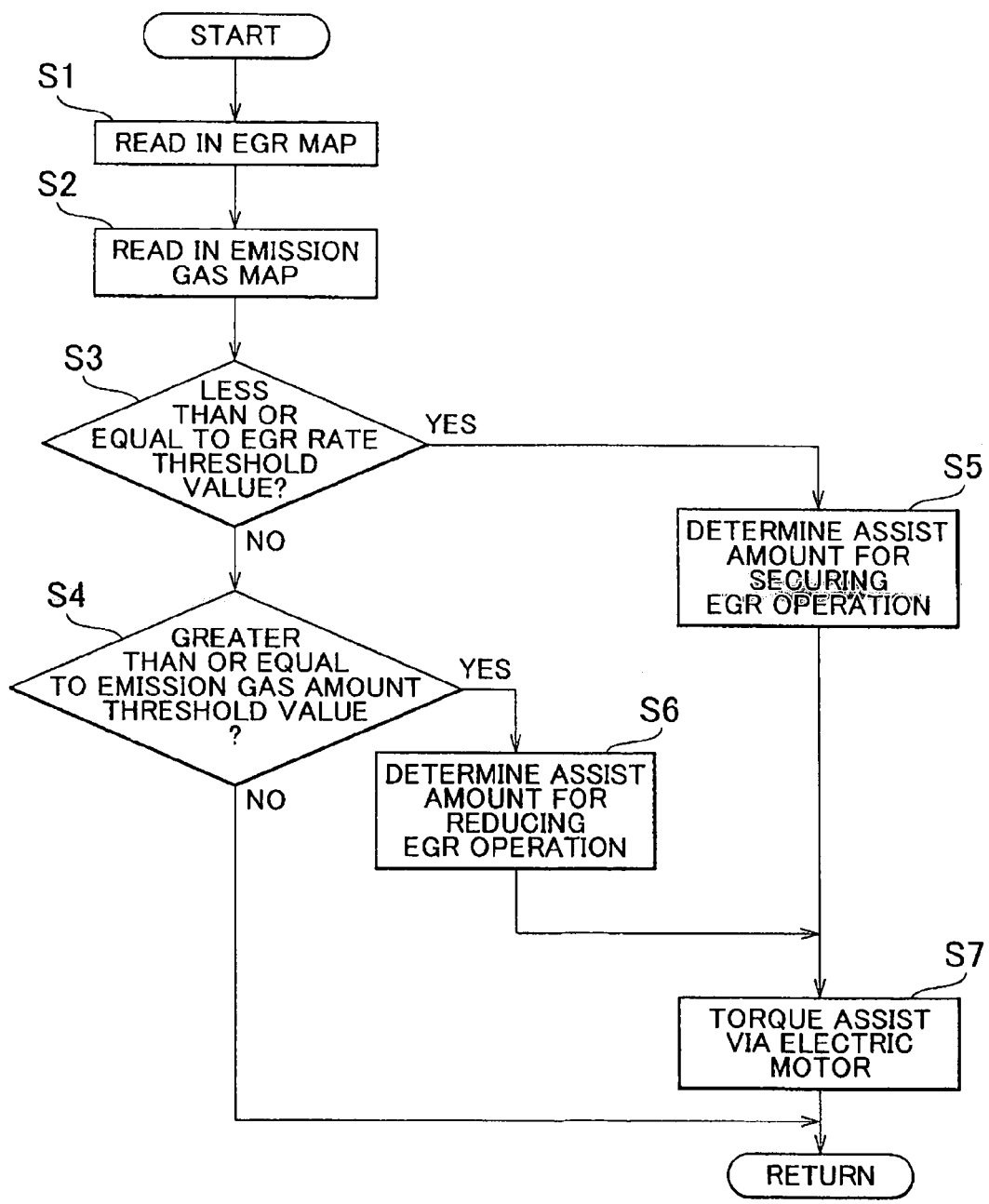
FIG. 16 is a flowchart illustrating a portion of the control operation of the electronic control apparatus shown in FIG. 4, that is, a control operation of curbing degradation of emission gas.

FIG. 16 is a flowchart illustrating a portion of the control operation of the electronic control apparatus 40, that is, a control operation of curbing degradation of emission gas. The operation in this flowchart is repeatedly executed on a predetermined cycle.

Figure 17:
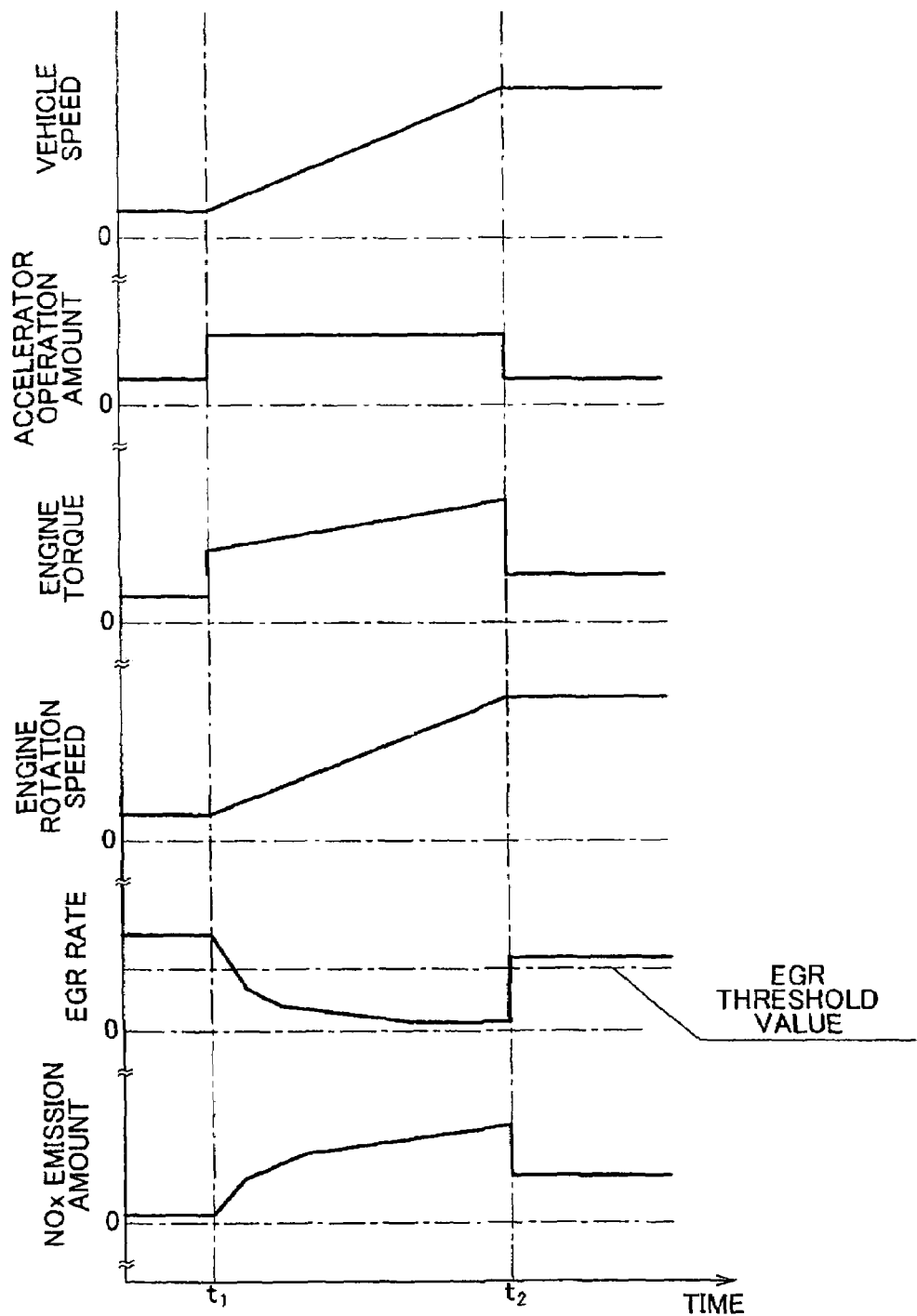
FIG. 17 is a time chart illustrating a control operation performed when the torque assist through the use of an electric motor is not performed at the time of an accelerating operation with added depression of an accelerator pedal.
Figure 18:
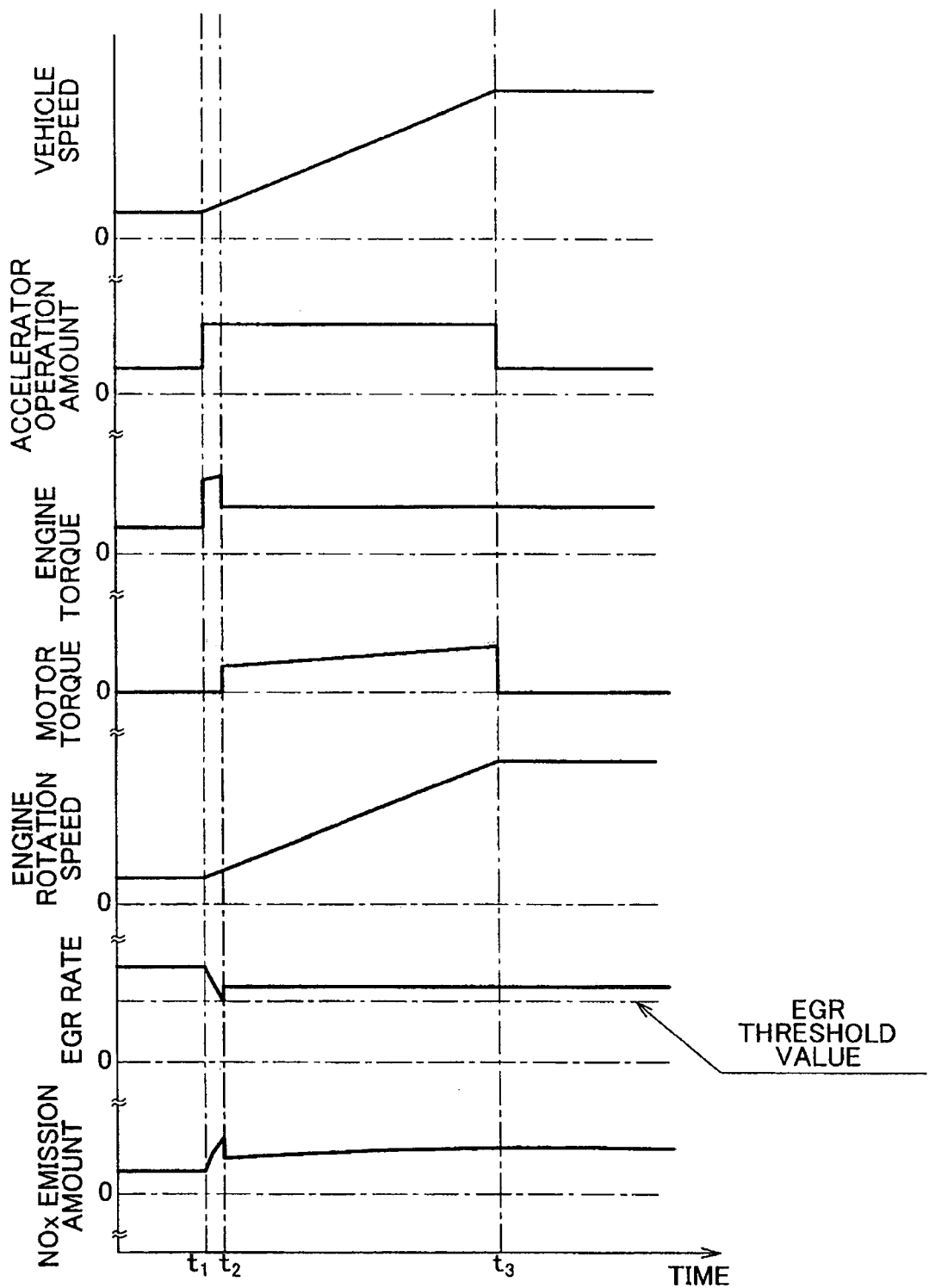
FIG. 18 is a time chart illustrating an example of the control operation shown by the flowchart of FIG. 16, that is, a control operation performed when the torque assist through the use of the electric motor is performed at the time of an accelerating operation with added depression of the accelerator pedal.

FIG. 17 is a time chart illustrating a control operation performed when the torque assist through the use of the electric motors MG1, MG2 is not performed at the time of an accelerating operation with added depression of the accelerator pedal 67. FIG. 18 is a time chart illustrating an example of the control operation shown by the flowchart of FIG. 16, that is, a control operation performed when the torque assist through the use of the electric motors MG1, MG2 is performed at the time of an accelerating operation with added depression of the accelerator pedal 67.

In FIG. 16, at a step (hereinafter, "step" will be omitted) S1 corresponding to the EGR rate read-in means 120, an EGR rate map, for example, one as shown in FIG. 5, is read in, and an EGR rate is read in as an actual EGR rate from the EGR rate map on the basis of the actual engine rotation speed NE and the actual engine torque TE.

In FIG. 17, due to an added depression of the accelerator pedal 67 at a time point t1, the engine torque TE and the engine rotation speed NE rise, that is, the engine 8 changes to higher load states, from the time point t1 on. In connection with the changes to higher load states, the EGR rate decreases. In FIG. 18, due to an added depression of the accelerator pedal 67 at a time point t1, the engine torque TE and the engine rotation speed NE rise, that is, the engine 8 changes to higher load states, at the time point t1 and a time point t2. In connection with the changes to higher load states, the EGR rate decreases.

Subsequently, at S2 corresponding to the emission gas amount read-in means 128, an empirically determined and pre-stored emission gas amount map, as for example, is read in, and an emission gas amount is read in as an actual emission gas amount from the emission gas amount map. For example, a NOx emission amount map as shown in FIG. 10 is read in, and a NOx emission amount is read in as an actual NOx emission amount from the NOx emission amount map on the basis of the actual engine rotation speed NE and the actual engine torque TE. Furthermore, a $CO_2$ emission amount map as shown in FIG. 11 is read in, and a $CO_2$ emission amount is read in as an actual $CO_2$ emission amount from the $CO_2$ emission amount map on the basis of the actual engine rotation speed NE and the actual engine torque TE.

Then, at S3 corresponding to the EGR threshold value determination means 118, it is determined whether or not the actual EGR rate read in at S1 is less than or equal to the EGR rate threshold value set on the basis of the load state of the engine 8 by the EGR rate threshold value setting means 116.

If the determination at S3 is negative, it is then determined at S4 corresponding to the emission gas amount determination means 126 whether or not the actual emission gas amount read in at S2 is greater than or equal to the emission gas amount threshold value set on the basis of the load state of the engine 8 by the emission gas amount threshold value setting means 124. For example, it is determined whether or not the actual NOx emission amount read in at S2 is greater than or equal to the NOx emission amount threshold value set on the basis of the load state of the engine 8 by the emission gas amount threshold value setting means 124. Or, it is determined whether or not the actual $CO_2$ emission amount read in at S2 is greater than or equal to the $CO_2$ emission amount threshold value set on the basis of the load state of the engine 8 by the emission gas amount threshold value setting means 124. If the determination at S4 is negative, this routine is ended.

If the determination at S3 is affirmative, the process proceeds to S5 corresponding to the torque assist amount determination means 122. At S5, a torque assist amount for the torque assist performed by the hybrid control means 114 through the use of the first motor-generator MG1 and/or the second motor-generator MG2 is set (determined) such that the actual EGR rate becomes greater than or equal to the EGR rate threshold value.

If the determination at S4 is affirmative, the process proceeds to S6 corresponding to the torque assist amount determination means 122. At S6, a torque assist amount for the torque assist performed by the hybrid control means 114 through the use of the first motor-generator MG1 and/or the second motor-generator MG2 is set (determined) such that the actual emission gas amount becomes less than or equal to the emission gas amount threshold value. For example, a torque assist amount is set such that the actual NOx emission amount becomes less than or equal to the NOx emission amount threshold value, or a torque assist amount is set such that the actual $CO_2$ emission amount becomes less than or equal to the $CO_2$ emission amount threshold value.

Subsequently to S5 or S6, at S7 corresponding to the hybrid control means 114, the torque assist is executed through the use of the first motor-generator MG1 and/or the second motor-generator MG2 so as to achieve the torque assist amount set at S5 or S6, or the torque assist amount obtained by adding the torque assist amount set at S6 to the torque assist amount set at S5.

The time point t2 in FIG. 18 indicates that the EGR rate decreases to or below the EGR rate threshold value. Then, as indicated between the time point t2 and the time point t3, the torque assist is executed through the use of the first motor-generator MG1 and/or the second motor-generator MG2. As a result, the engine torque TE as the engine load is lessened by the amount of the torque assist, so that the EGR rate is kept above or at the EGR rate threshold value. Thus, the increase in the NOx emission amount is curbed. The time point t3 in FIG. 18 indicates that the accelerator pedal 67 is returned and the engine 8 shifts to a lower load state and, therefore, that the torque assist ends.

In the embodiment of FIG. 17 in comparison with the embodiment of FIG. 18, when the EGR rate decreases to or below the EGR rate threshold value, the torque assist is not executed and, therefore, the engine load is not lessened, unlike the embodiment of FIG. 18. As the engine load rises, the EGR rate decreases and the NOx emission amount is increased. The time point t2 in FIG. 17 indicates that the accelerator pedal 67 is returned and, therefore, the engine 8 changes to a lower load state and, therefore, the EGR rate rises and the NOx emission amount is decreased.

As described above, according to the embodiment, the torque assist is executed by the hybrid control means 114 through the use of the first motor-generator MG1 and/or the second motor-generator MG2 so that the EGR rate achieved by the EGR device 64 becomes greater than or equal to the EGR rate threshold value (first EGR rate) set on the basis of the load state of the engine 8. Therefore, it becomes possible to put the engine 8 in a low load state where the EGR rate, which decreases as the engine 8 shifts to higher load states, is greater than or equal to the EGR rate threshold value. In other words, regions where the EGR rate greater than or equal to the EGR rate threshold value can be secured by putting the engine 8 in the low load state are expanded and, therefore, degradation of emission gas is curbed. Furthermore, since the torque assist is executed by the hybrid control means 114 through the use of the first motor-generator MG1 and/or the second motor-generator MG2, the output necessary to run the vehicle can be secured even if the engine 8 is put in the low load state.

Furthermore, in this embodiment, the supercharger 54 is provided. The above-described effect becomes more remarkable when the supercharging is performed, since the supercharging puts the engine 8 in a higher load state with a reduced EGR rate.

Furthermore, according to the embodiment, the hybrid control means 114 omits the performance of the torque assist through the use of the first motor-generator MG1 and/or the second motor-generator MG2 if the EGR rate achieved by the EGR device 64 is greater than or equal to the second EGR rate that is set greater than the first EGR rate. Therefore, in a low load state of the engine where the EGR rate achieved by the EGR device 64 is basically high, the energy loss associated with the use of the first motor-generator MG1 and/or the second motor-generator MG2 disappears.

According to this embodiment, the torque assist is executed by the hybrid control means 114 through the use of the first motor-generator MG1 and/or the second motor-generator MG2 so that the amount of emission gas of the engine 8 is less than or equal to the emission gas amount threshold value that is determined on the basis of the load state of the engine 8. Therefore, it becomes possible to put the engine 8 in a low load state where the emission gas amount, which increases as the engine 8 shifts to higher load states, is less than or equal to the emission gas amount threshold value. In other words, regions where the emission gas amount less than or equal to the emission gas amount threshold value can be secured by putting the engine 8 in a low load state are expanded and, therefore, degradation of emission gas is curbed. Furthermore, since the torque assist is executed by the hybrid control means 114 through the use of the first motor-generator MG1 and/or the second motor-generator MG2, the output necessary to run the vehicle can be secured even if the engine 8 is put in a low load state.

Furthermore, according to the embodiment, when torque assist is not performed by the hybrid control means 114 through the use of the first motor-generator MG1 and/or the second motor-generator MG2, the shift control means 112 switches the gear stage of the automatic transmission 10 to a lower speed-side gear stage (lower gear) so that even if the output of the engine 8 decreases, reduction in the driving torque on the driving wheels 32 will be curbed. Therefore, by reducing the output of the engine 8, that is, by decreasing the load state of the engine 8, an EGR rate can be secured and the emission gas amount can be reduced. Furthermore, the switching of the gear stage of the automatic transmission 10 to a lower speed-side stage (lower gear) makes it possible to prevent the degradation in the running performance of the vehicle caused by reduced engine output, and thus to secure a good running performance.

While embodiments of the invention have been described above in detail with reference to the drawings, the invention is also applicable in other manners or the like.

For example, although the driving apparatus 6 in the foregoing embodiments is provided with the first motor-generator MG1 and the second motor-generator MG2 as a second driving power source, provision of at least one electric motor capable of at least being put into a powering state to generate driving power is sufficient for a second power driving source. Furthermore, the electric motor may be provided downstream of the input shaft 16 of the automatic transmission 10, for example, between the input shaft 16 and the output shaft 28, or between the output shaft 28 and the driving wheels 32.

Although in the foregoing embodiments, the hybrid control means 114 executes the torque assist through the use of the first motor-generator MG1 and/or the second motor-generator MG2 as a second driving power source, the torque assist may also be executed through the use of a device other than the first motor-generator MG1 and/or the second motor-generator MG2. For example, energy (e.g., regenerative energy) may be stored in a flywheel, and energy of the flywheel may be used for the torque assist in order to make the EGR rate achieved by the EGR device 64 greater than or equal to the EGR rate threshold value or make the amount of emission gas of the engine 8 less than or equal to the emission gas amount threshold value. Furthermore, hydraulic pressure (e.g., regenerative energy) may be stored in an accumulator, and the accumulated hydraulic pressure may be used to drive an oil motor for use for the torque assist.

Although in the driving apparatus 6 of the foregoing embodiments, the engine 8 and the automatic transmission 10 (input shaft 16) are directly coupled mechanically via the lockup clutch Ci, a fluid power transfer device such as a torque converter may be provided as a power transfer device in place of the lockup clutch Ci.

In the case where the torque converter is provided with a lockup clutch, the shift control means 112 may release the lockup clutch as a power transfer device or reduce the slip amount (slip rate) of the lockup clutch, so that even if the output of the engine 8 decreases, reduction in the driving torque on the driving wheels 32 is curbed, when the torque assist is not performed by the hybrid control means 114 through the use of the first motor-generator MG1 and/or the second motor-generator MG2, in order to make the EGR rate achieved by the EGR device 64 greater than or equal to the EGR rate threshold value or make the amount of emission gas of the engine 8 less than or equal to the emission gas amount threshold value. As a result, due to the torque amplifying effect of the torque converter, the load state of the engine 8 at a given vehicle speed, for example, in an accelerating condition, can be made less severe. Therefore, it is possible to achieve effects of curbing reduction in the EGR rate and curbing the emission gas amount, as is the case with the switching of the gear stage of the automatic transmission 10 to a lower speed-side gear stage (lower gear).

Furthermore, although in the foregoing embodiments, the hybrid control means 114 executes the torque assist so that the EGR rate (=the EGR amount/the inflow air amount) becomes greater than or equal to the first EGR rate, the EGR rate may be replaced by the EGR amount (=the first EGR rate×the inflow air amount). For example, the hybrid control means 114 executes the torque assist so that the EGR amount becomes greater than or equal to the first EGR amount (=the first EGR rate×the inflow air amount). Although the EGR threshold value determination means 118 (see S3 in FIG. 16) determines whether or not the EGR rate is greater than or equal to the first EGR rate, it may also be determined whether or not the actual EGR amount is greater than or equal to a first EGR amount (EGR amount threshold value) that is set by the EGR rate threshold value setting means 116. The actual EGR amount is determined by, for example, the EGR rate read-in means 120. For example, the actual EGR rate may be computed from the EGR rate read in from the EGR rate map as shown in FIG. 5, and the inflow air amount. The actual EGR amount may also be read in from a pre-determined EGR map obtained by adding the inflow air amount as a parameter to the aforementioned EGR map, on the basis of the actual engine rotation speed NE and the actual engine torque TE. Furthermore, the EGR amount may be directly read in by a sensor, such as a flow meter or the like, or may also be computed on the basis of the engine rotation speed and the opening/closure amount of the EGR valve 66. Therefore, it becomes possible to put the engine 8 in a low load state where the EGR amount, which decreases as the engine 8 shifts to higher load states, is greater than or equal to the EGR amount threshold value. In other words, regions where the EGR amount greater than or equal to the EGR amount threshold value can be secured by putting the engine 8 in a low load state are expanded and, therefore, degradation of emission gas is curbed. Furthermore, since the torque assist is executed by the hybrid control means 114 through the use of the first motor-generator MG1 and/or the second motor-generator MG2, the output necessary to run the vehicle can be secured even if the engine 8 is put in a low load state.

Although in the foregoing embodiments, the hybrid control means 114 omits the execution of the torque assist if the EGR rate is greater than or equal to the second EGR rate that is set greater than the first EGR rate, the EGR amount may be used instead of the EGR rate. For example, the hybrid control means 114 omits the performance of the torque assist if the EGR amount is greater than a second EGR amount that is set greater than a first EGR amount. Due to this arrangement, in a low load state of the engine where the EGR amount achieved by the EGR device 64 is basically large, the energy loss associated with the use of the first motor-generator MG1 and/or the second motor-generator MG2 disappears.

Furthermore, although in the foregoing embodiments, the engine 8 is provided with the supercharger 54, this provision is not altogether necessary. Even if the supercharger 54 is not provided, the invention is applicable.

What has been described above are merely preferred embodiments of the invention. The invention can also be embodied in various other manners with modifications and improvements based on the knowledge of those skilled in the art.

What is claimed is:

1. A control method for a vehicular driving apparatus comprising an engine as a driving power source, a second driving power source for assisting the engine in output of driving power, and an emission gas recirculation device for recirculating a portion of an emissions gas of the engine to an intake system, comprising:

controlling operation of the second driving power source so that an emission gas recirculation amount provided by the emission gas recirculation device becomes greater than or equal to a first emission gas recirculation amount that is set based on a load state of the engine.

2. A control method for a vehicular driving apparatus comprising an engine as a driving power source, a second driving power source for assisting the engine in output of driving power, and an emission gas recirculation device for recirculating a portion of an emissions gas of the engine to an intake system, comprising:

controlling operation of the second driving power source so that an emission gas recirculation rate provided by the emission gas recirculation device becomes greater than or equal to a first emission gas recirculation rate that is set based on a load state of the engine.

3. A control method for a vehicular driving apparatus comprising an engine as a driving power source, and a second driving power source for assisting the engine in output of driving power, comprising:

controlling operation of the second driving power source so that an emission gas amount of the engine becomes less than or equal to a first emission gas amount that is set based on a load state of the engine.

4. A control apparatus of a vehicular driving apparatus comprising an engine as a driving power source, a second driving power source for assisting the engine in output of driving power, and an emission gas recirculation device for recirculating a portion of an emission gas of the engine to an intake system, comprising:

a controller that controls operation of the second driving power source so that an emission gas recirculation amount provided by the emission gas recirculation device becomes greater than or equal to a first emission gas recirculation amount that is set based on a load state of the engine.

5. The control apparatus of the vehicular driving apparatus according to claim 4, wherein said controller controls operation of the second driving power source so as to assist the engine in the output of driving power if the emission gas recirculation amount is less than the first emission gas recirculation amount.

6. The control apparatus of the vehicular driving apparatus according to claim 4, wherein said controller controls operation of the second driving power source so as not to assist the engine in the output of driving power if the emission gas recirculation amount is greater than or equal to a second emission gas recirculation amount that is set greater than the first emission gas recirculation amount.

7. The control apparatus of the vehicular driving apparatus according to claim 4, further comprising:

a power transfer device that transfers the output of the engine to a driving wheel; and another controller that controls a power transfer state of the power transfer device so that, if it becomes impossible for the second driving power source to assist the engine in the output of driving power, a reduction in driving torque on the driving wheels is curbed even if the output of the engine decreases.

8. A control apparatus of a vehicular driving apparatus comprising an engine as a driving power source, a second driving power source for assisting the engine in output of driving power, and an emission gas recirculation device for recirculating a portion of an emission gas of the engine to an intake system, comprising:

a controller that controls operation of the second driving power source so that an emission gas recirculation rate provided by the emission gas recirculation device becomes greater than or equal to a first emission gas recirculation rate that is set based on a load state of the engine.

9. The control apparatus of the vehicular driving apparatus according to claim 1, wherein said controller controls operation of the second driving power source so as to assist the engine in the output of driving power if the emission gas recirculation rate is less than the first emission gas recirculation rate.

10. The control apparatus of the vehicular driving apparatus according to claim 1, wherein said controller controls operation of the second driving power source so as not to assist the engine in the output of driving power if the emission gas recirculation rate is greater than or equal to a second emission gas recirculation rate that is set greater than the first emission gas recirculation rate.

11. The control apparatus of the vehicular driving apparatus according to claim 8, further comprising:

a power transfer device that transfers the output of the engine to a driving wheel; and another controller means that controls a power transfer state of the power transfer device so that, if it becomes impossible for the second driving power source to assist the engine in the output of driving power, a reduction in driving torque on the driving wheels is curbed even if the output of the engine decreases.

12. A control apparatus of a vehicular driving apparatus comprising an engine as a driving power source, and a second driving power source for assisting the engine in output of driving power, comprising:

a controller which controls operation of the second driving power source so that an emission gas amount of the engine becomes less than or equal to a first emission gas amount that is set based on a load state of the engine.

13. The control apparatus of the vehicular driving apparatus according to claim 12, wherein said controller controls operation of the second driving power source to assist the engine in the output of driving power if the emission gas amount exceeds the first emission gas amount.

14. The control apparatus of the vehicular driving apparatus according to claim 12, wherein said controller controls operation of the second driving power source so as not to assist the engine in the output of driving power if the emission gas amount is less than or equal to a second emission gas amount that is set less than the first emission gas amount.

15. The control apparatus of the vehicular driving apparatus according to claim 12, wherein the emission gas amount is an amount of NOx.

16. The control apparatus of the vehicular driving apparatus according to claim 12, wherein the emission gas amount is an amount of CO2.

17. The control apparatus of the vehicular driving apparatus according to claim 12, further comprising:

a power transfer device that transfers the output of the engine to a driving wheel; and another controller that controls a power transfer state of the power transfer device so that, if it becomes impossible for the second driving power source to assist the engine in the output of driving power, a reduction in driving torque on the driving wheels is curbed even if the output of the engine decreases.

* * * * *